US009500158B1

(12) United States Patent
Anthony

(10) Patent No.: US 9,500,158 B1
(45) Date of Patent: Nov. 22, 2016

(54) THERMAL ENGINE FOR OPERATION WITH NONCOMBUSTIBLE FUELS

(76) Inventor: Michael Anthony, Hohenwald, TN (US)

(*) Notice: Subject to any disclaimer, the term of this patent is extended or adjusted under 35 U.S.C. 154(b) by 38 days.

(21) Appl. No.: 13/506,943

(22) Filed: May 25, 2012

Related U.S. Application Data

(63) Continuation-in-part of application No. 12/380,626, filed on Mar. 2, 2009, now Pat. No. 8,186,160.

(51) Int. Cl.
| | | |
|---|---|---|
| *F01P 1/00* | (2006.01) | |
| *F01K 15/00* | (2006.01) | |
| *F02G 1/043* | (2006.01) | |

(52) U.S. Cl.
CPC ..................... *F02G 1/043* (2013.01)

(58) Field of Classification Search
USPC .......... 60/643, 668, 670, 646, 657, 508, 515
See application file for complete search history.

(56) References Cited

U.S. PATENT DOCUMENTS

| | | | | |
|---|---|---|---|---|
| 6,606,860 | B2* | 8/2003 | McFarland | 60/648 |
| 7,124,586 | B2* | 10/2006 | Negre et al. | 60/645 |
| 8,186,160 | B2* | 5/2012 | Anthony | 60/646 |

* cited by examiner

*Primary Examiner* — Hoang Nguyen
(74) *Attorney, Agent, or Firm* — Frank L. Kubler

(57) ABSTRACT

A thermal engine includes a cylinder and piston and an insulated thermal battery including at least a thermal mass such as the engine block itself for storing and retaining heat to enhance or cause fluid expansion within the cylinder and drive the piston, the thermal battery optionally including an electrolyte chamber containing a thermal electrolyte for functioning as an electric thermal battery. Heat is stored in the thermal battery such as by activating electric resistance heating elements in the thermal mass. The stored heat either causes expansion of a non-combustible expansion fluid such as water or enhances the expansion of a combustible expansion fluid such as gasoline. Where the thermal battery is an electric thermal battery containing an electrolyte, the storage of heat also stores electricity which can be used to power an electric motor.

43 Claims, 19 Drawing Sheets

THERMAL ENGINE FOR OPERATION WITH NONCOMBUSTIBLE FUELS

FILING HISTORY

This application is a continuation-in-part of application Ser. No. 12/380,626, filed on Mar. 2, 2009, now U.S. Pat. No. 8,186,160.

BACKGROUND OF THE INVENTION

1. Field of the Invention

The present invention relates generally to the field of engines which convert heat into mechanical energy. More specifically the present invention relates to a thermal engine such as for powering a vehicle, including a cylinder and a piston having a piston head and a piston crank and an insulated thermal battery including at least a thermal mass such as a metal block for storing and retaining heat to cause expansion fluid to expand inside the a cylinder expansion chamber between the cylinder head and the piston head to drive a crankshaft.

In its most basic form, as mentioned above generally, the thermal engine incorporates several conventional engine elements including engine valve block cover sealingly mated to an engine valve block sealingly mated to an engine block sealingly mated to an oil sump. The engine block having a cylinder chamber within which a piston head is slidably and sealingly retained to form a variable volume cylinder expansion chamber between a piston head and the engine valve block, said engine valve block having a intake valve port with a intake valve and having an exhaust valve port with an exhaust valve; the intake valve port fluidly connected to an intake chamber within the valve cover for receiving expanded fluid from the thermal battery, said exhaust valve port fluidly connected to an exhaust chamber for removal of exhausted expanded fluid; a crankshaft mechanically linked to the piston head opposite the engine valve block by a piston crank, a valve operating means comprising a cam shaft and cams mounted thereon, said cam shaft driven by the torque of a drive shaft; an engine starting means connected to drive shaft; a thermal battery consisting of a contiguous thermal battery case divided into two separate fluid chambers by a thermal mass for storing heat energy, the first chamber consisting of a thermal battery expansion chamber in fluid communication with the intake chamber and the expansion fluid tank, an expansion fluid pump for delivering expansion fluid from the expansion fluid tank into a thermal battery, the thermal battery consisting of a contiguous thermal battery case divided into two separate fluid chambers by a thermal mass for storing heat energy, the first chamber consisting of a thermal battery expansion chamber in fluid communication with the intake chamber and the second chamber consisting of a hermetically sealed thermal battery vacuum chamber surrounding most of the thermal mass, said thermal battery expansion chamber having thermal mass expansion fluid passageways within said thermal mass for accepting expansion fluid from the expansion fluid pump to uniformly heat and expand expansion fluid from a liquid phase to an expanded fluid in the vapor phase within the thermal mass, the thermal mass expansion fluid passageways fluidly connected to transmit and accumulate pressurized expanded fluid vapor into the thermal battery expansion chamber and then into the intake chamber so that when the engine starting means turns the drive shaft, the expansion fluid pump delivers a quantity of expansion fluid into the thermal mass expansion fluid passageways causing expansion fluid to expand into a vapor and become expanded fluid, and when the piston head is at top dead center of the cylinder chamber a cam opens the intake valve and expanded fluid vapor is passed through the intake valve port into the cylinder expansion chamber to generate pressure and drive the piston head from top dead center to bottom dead center, the piston head motion generating a force transmitted by the piston crank to turn the crankshaft and generate mechanical power using the thermodynamic potential of the expanded fluid vapor, so that when the piston head is at bottom dead center the drive force generated on the drive shaft causes a cam to close the intake valve and a cam to open the exhaust valve and cause expanded fluid vapor to exit through exhaust valve port into the exhaust chamber for removal of exhaust expanded fluid as the piston head rises to top dead center passing expanded fluid vapor into a radiator to cool and condense the expanded fluid vapor back into expansion fluid and to advantageously generate a negative vapor pressure to assist and pull the piston head back to top dead center to repeat the cycle; a flow check valve on the radiator output prevents back flow of condensate to maintain a negative pressure; an expansion fluid tank to receive condensed expansion fluid from the radiator, an expansion fluid pump for pumping expansion fluid from the expansion fluid tank back into the thermal mass expansion fluid passageways to repeat the process.

The valve operating means preferably includes a cam shaft and push rods exhaust valve and intake valve riding on cams along the cam shaft which forces them to open and close against a cam spring compression force in a conventional fashion. A flywheel is attached to the drive shaft connected to one end of the crankshaft preferably extends out of the crankcase through a shaft port to transmit the thermal engine power in the form of torque to any desired mechanical load such as the pump.

In the closed cycle format of the invention, the expansion fluid delivery means preferably is an expansion fluid pump or simply gravity in the case of a small engine. In the case of an open cycle format of the present invention, the expansion fluid delivery means alternatively consists of pressurizing the expansion fluid tank to pump out expansion fluid into the thermal mass expansion fluid passageways by pressure. In the closed cycle format, no expansion fluid is lost and the same quantity of expansion fluid remains in the engine cycle in vapor and liquid phase and is reused over and over again by means of condensation. In the case of an open cycle format the expanded fluid is exhausted into the atmosphere without the need for a radiator.

In general operation of the closed cycle engine, heat is generated and stored in the thermal mass by one of two means. The first means is by passing electric current through resistive heating elements embedded in the thermal mass for a period of time and the second alternative means is by imposing an electromagnetic induction heating means on the thermal mass for a period of time. The thermal engine is started by rotating a drive shaft connected to turn a crankshaft. The crankshaft turns an expansion fluid pump which pumps a quantity of expansion fluid from an expansion fluid tank through a flow regulator into the thermal mass expansion fluid passageways. The flow regulator allows only the prescribed amount of expansion fluid to pass into the thermal mass expansion fluid passageways and the heat stored in the thermal mass causes the expansion fluid to expand by a phase change into expanded fluid to generate pressure in the intake chamber. The turning of the crankshaft causes the piston head to move and when it rises to top dead center, the cam shaft is positioned to cause the cam to push the intake valve to an open position while causing the exhaust valve to go into a closed position. The pressurized expanded fluid in the intake chamber rushes through intake valve port into the cylinder expansion chamber and pushes the piston head to bottom dead center position turning the crankshaft and thereby rotating the cam shaft to cause the cam to close the intake valve and also open the exhaust valve causing the piston head to return to top dead center position using the momentum stored in a flywheel and allowing the expanded fluid to exit the cylinder expansion chamber into the exhaust chamber through exhaust valve port. The expanded fluid is either transported through an exhaust tube to the radiator in the closed cycle format of the invention, or it is expelled to atmosphere in the open cycle format of the invention through the exhaust tube.

In the closed format of the invention, the radiator cools the expanded fluid vapor back into expansion fluid and a check valve at the end of the exhaust tube generates a vacuum within the exhaust chamber to increase the power of the thermal engine since when the exhaust valve port opens the negative pressure in the cylinder expansion chamber will, in addition to the energy stored in the flywheel, cause the piston head to rapidly return by negative pressure to top dead center position. This adds more power to the thermal engine since the invention essentially teaches the use of expansion fluid in both its pressurized vapor expanded fluid form and its vacuum condensate state to push and return the piston head from top dead center position to bottom dead center position and back to top dead center position. This vacuum assistance is possible in both the open cycle format and the closed cycle format if the exhausted expanded fluid is passed through a long enough exhaust tube before being exhausted to atmosphere. In such a case, the rapid cooling of the expanded fluid in the exhaust tube causes the expanded fluid to undergo a phase change from the vapor phase to the liquid phase and such rapid condensation results in a vacuum being generated momentarily in the exhaust chamber. Thus, by adjusting the length of the exhaust tube, it is possible to regulate the timing of the vacuum formed with the motion of the piston head as moves from top dead position center to bottom dead center position and then back to top dead center position.

At close to bottom dead center the turning of the crankshaft, the momentum stored in the flywheel, and the negative pressure of vapor condensation causes the piston head to rapidly move back towards top dead center to repeat the cycle and to rotate the cam shaft to a position that causes the cam to make the intake valve close while causing the exhaust valve to open. In a closed cycle format of the invention, the pressurized expanded fluid in the cylinder expansion chamber is pushed through exhaust valve port into the exhaust chamber allowing the expanded fluid to exit the cylinder expansion chamber and through the exhaust tube into the radiator. Alternatively the expanded fluid can exit the cylinder expansion chamber through the exhaust tube to bypass the radiator and be expelled directly to atmosphere. The piston head freely returns to top dead center by the continued angular momentum, the rotation of the crankshaft and flywheel and allowing the remaining elements of the expanded fluid out of the cylinder into the exhaust chamber to cool either in the exhaust tube or in the radiator to and generate a negative pressure of vapor condensation so that the cycle can continuously repeat until stopped. To stop the cycle, the flow regulator is simply closed off to stop the flow of expansion fluid into the thermal battery.

2. Description of the Prior Art

So-called gas and combustible fluid engines are known that can operate with different types of fuels and are based on certain thermodynamic principles, such as the Diesel, Carnot, Rankine, and Otto cycles. In combustion engines an air-fuel mixture is compressed and then ignited. The compression results in an expansion of gases within the cylinder chamber, pushing a piston slidably retained within the cylinder in a repeated cycle to turn a crank shaft and so to generate mechanical power from the fuel. The current prior art engines therefore rely on combustible fuels that cause global pollution and health associated problems. In an effort to reduce the pollution and dependence on fossil fuels, several types of engines have been invented including electrically powered vehicles which rely on the storage of electric power in batteries.

While these vehicles are of current interest, a growing concern about the disposal of chemical batteries and the efficient global transformation of these new technologies to replace existing technologies has emerged. What is needed is a thermal engine design which adopts a philosophy of replacing or assisting existing technologies such as fossil fuel combustion engines and electric battery powered vehicles. Such a thermal engine as described by the present invention uses thermally generated power in a closed or open thermodynamic cycle to generate power without pollution. It also can be used in conjunction with conventional engines to improve their efficiencies without substantial change to current engine manufacturing technology.

It is thus an object of the present invention to provide an engine which can be operated with non-combustible expansion fluids which do not combust and which uses a phase change to expand a fluid from a liquid phase to a vapor phase and generate power thereby achieve a high degree of efficiency during operation. An engine of this kind, in accordance with the invention, can be optimized by its geometry through maximizing the thermal mass and minimizing the surface area of the thermal battery for storing a maximum amount of thermal energy in the form of a direct heat. Without limiting the scope of the invention, however, the preferred mode of operation is in a pure thermal mode where the thermal battery is simply a thermal mass consisting of a ceramic composite and alternatively metal allows and molten salts that have high thermal storage capacity.

It is another object of the present invention to provide and thermal battery which can be used in conjunction with a molten electrolytic salt contained within the battery as a thermal mass to store heat.

It is still another object of the present invention to provide an engine in which pressure generated when vapor expands from a liquid state can then be used as a vapor powered engine, whereof, a liquid such as water is injected into the thermal mass of the engine to generate pressurized steam as an expanded fluid to generate power.

Advantageously, much more energy can be stored in such a thermal battery than in a conventional electric battery of the same weight since the thermal storage capacity of a regular chemical battery far exceeds its electric storage energy. It is in fact the preferred means that Nature has chosen to store energy in stars and gravitating bodies.

Advantageously, such a thermal battery powered engine can be equipped with an expansion fluid condensation radiator to generate addition negative pressure within the cylinder during the exhaust cycle to increase the power of the engine.

It is a further objective of the present invention to disclose a thermal engine that is powered by a thermal battery causing a phase change in an expansion fluid from a liquid phase to a vapor phase.

It is a further objective of the present invention to disclose a thermal engine that can be operated in a closed cycle without any exhaust and that reuses a fixed amount of expansion fluid in a closed cycle that undergoes a phase change from a liquid to a vapor to do thermodynamic work and then back to a liquid phase to be reused in a continuous fashion.

It is a further objective of the present invention to disclose a thermal engine that can be operated in an open cycle that uses an indefinite amount of water as an expansion fluid that undergoes a phase change to steam to do thermodynamic work and that can be exhausted to atmosphere without causing pollution.

It is a further objective of the present invention to disclose a thermal engine that can be recharged by means of electric thermal heating means over a period of time to store energy in a thermal battery.

It is a further objective of the present invention to disclose a thermal engine that can be rapidly recharged by means of electromagnetic induction heating over a period of time to store energy in a thermal battery. Advantageously such an electromagnetic induction charging system can be non-invasive and thus in the case when the thermal engine is used in a vehicle, the vehicle would simply slowly pass over such an inductor placed alongside or under the road and gets charged without having to stop.

It is finally an object of the present invention to provide an engine which is highly efficient and easy to operate and environmentally friendly. Advantageously the thermal battery can be made from recyclable materials that have no adverse environmental effects.

Advantageously, unlike electric batteries whose potential deteriorates with the number of charges, the thermal battery can be recharged with heat a large number of times without reducing its capacity to store heat energy, and without deterioration. Further, the thermal battery is environmentally safe and can be reused to manufacture new items by recycling its material without any consequences to the environment.

Further, in an open cycle embodiment of the present invention, the exhaust of the engine using a thermal battery can be pure water or steam. In a closed cycle format embodiment of the present invention, any refrigerant fluid that has suitable thermodynamic properties can be used since the exhausted condensate of the expanded fluid is recaptured from the engine and recycled, and such an engine would need very little expansion fluid to operate in a closed system and no emissions would result.

SUMMARY OF THE INVENTION

The present invention accomplishes the above-stated objectives, as well as others, as may be determined by a fair reading and interpretation of the entire specification.

The present invention relates generally to the field of engines which convert heat into mechanical energy. More specifically the present invention relates to a thermal engine such as for powering a vehicle, including a cylinder and a piston having a piston head and a piston crank and an insulated thermal battery including at least a thermal mass such as a metal block for storing and retaining heat to cause expansion fluid to expand inside the a cylinder expansion chamber between the cylinder head and the piston head to drive a crankshaft.

Since the anticipated operating temperature of the thermal expansion fluid depends on it boiling point, except for the thermal battery, the remaining thermal engine can be constructed from durable materials such as aluminum and a suitable plastic material such as polypropylene or peek. In its most basic form, as mentioned above generally, the thermal engine incorporates several conventional engine elements including valve cover sealingly mated to a valve block sealingly mated to an engine block with a crank case that is sealingly mated to a sump. These components of the thermal engine could be injection molded from suitable plastics and then lined with stainless steel inserts in areas where wear might be a problem.

The engine block has one or more longitudinal spaced cylinder chambers bored through it with axes perpendicular to its open face within each of which a piston head is slidably and sealingly retained to form a variable volume cylinder expansion chamber between the piston head and the valve block. The other end of the engine block is sealingly connected to thin walled crankcase. The anticipated operating temperature of the engine block, the valve cover, the valve block, the crankcase, the sump and the piston head is below the melt point of most plastics and so these components could be constructed from durable plastics such as Peek, Vespel® SP-1 Polyimide, Melding 7001 Polyimide, Kapton® Polyimide, Kaptrex® Polyimide, Torlon® 4203, Vestakeep® PEEK, CeramaPEEK®, Ryton®-PPS-40% Glass-Filled and Celazole® PBI. Celazole® PBI offers the highest heat resistance and mechanical property retention over 400° F. well above the boiling point of water. The cylinder chamber could be lined with stainless steel sleeves to prevent wear due to the sliding motion of the piston head. The piston head has piston rings that form an adequate slide seal with the cylinder chamber. A crankshaft is mechanically linked to the piston head opposite the valve block by a piston crank.

The valve block has intake valve ports with intake valves and the same number of exhaust valve ports with exhaust valves for fluid communication with the cylinder chambers in the engine block; the valve cover sealing forms an intake chamber and an exhaust chamber over the intake valve port and the exhaust valve ports respectively. The intake chamber is fluidly connected to receive expanded fluid through an intake tube from a thermal battery; the exhaust chamber is fluidly connected to an exhaust tube at the end of which is a check valve that only allows exhaust expanded fluid from the exhaust chamber to exit the exhaust tube. A radiator may be optionally placed after the check valve to cool and condense exhausted vapor from the exhaust chamber. A thermal battery consisting of a contiguous thermal battery case divided into two separate fluid chambers by a thermal mass for storing heat energy, the first chamber consisting of a thermal battery expansion chamber in fluid communication with the intake chamber an expansion fluid tank, an expansion fluid pump for delivering expansion fluid from the expansion fluid tank into a thermal battery, the thermal battery consisting of a contiguous thermal battery case divided into two separate fluid chambers by a thermal mass for storing heat energy, the first chamber consisting of a thermal battery expansion chamber in fluid communication with the intake chamber and the second chamber consisting of a hermetically sealed thermal battery vacuum chamber surrounding most of the thermal mass, said thermal battery expansion chamber having thermal mass expansion fluid passageways within said thermal mass for accepting expansion fluid from the expansion fluid pump to uniformly heat and expand expansion fluid from a liquid phase to an expanded fluid in the vapor phase within the thermal mass, the thermal mass expansion fluid passageways fluidly connected to transmit and accumulate pressurized expanded fluid vapor into the thermal battery expansion chamber and then into the intake chamber. The thermal battery case must be made from heat resistant and low expansion materials such as ceramics and metal allows. It cannot be made from plastic or aluminum since it must withstand very high temperatures.

An exhaust cam shaft is axially positioned inside the exhaust chamber with a cam mounted thereon above each exhaust valve. An intake cam shaft is axially positioned inside the intake chamber with a cam mounted thereon above each intake valve. Both cam shafts are suitably mechanically attached by a drive belt or gear system to a drive shaft at the end of the crankshaft. An engine starter is also connected to drive shaft to rotate the drive shaft when the thermal engine is started.

The thermal engine further comprises an expansion fluid tank that is fluidly connected to the radiator in a closed cycle format of the invention. In a closed cycle format, the radiator condenses expanded fluid vapor back to expansion fluid which is taken to the expansion fluid tank. An intake tube connects the expansion fluid tank to the thermal battery expansion passageways. Thus there is continuity in fluid communication from the expansion fluid tank through the flow regulator into the thermal battery expansion passageways into the thermal battery expansion chamber into the intake chamber to the intake valve ports, which if open will have fluid communication with the cylinder expansion chamber to move the piston head and fluidly communicate with the exhaust chamber through the exhaust valve port, which if open will fluidly communicate through the exhaust tube and through the check valve with either atmosphere when an open cycle design is used, or with the radiator and then and finally with the expansion fluid tank when a closed cycle is used.

Thus when the engine starter turns the drive shaft, the expansion fluid pump delivers a quantity of expansion fluid through the flow regulator into the thermal mass expansion fluid passageways causing expansion fluid to expand into a vapor and become expanded fluid; and when the piston head is at top dead center of the cylinder chamber the intake cam shaft rotates such that a cam opens the intake valve and expanded fluid vapor is passed through the intake valve port into the cylinder expansion chamber to generate pressure and drive the piston head from top dead center to bottom dead center, and the piston head motion generates a force transmitted by the piston crank to turn the crankshaft and generate mechanical power using the thermodynamic potential of the expanded fluid vapor; and when the piston head is at bottom dead center the drive force generated on the drive shaft causes the intake cam shaft to rotate by 180° and a cam closes the intake valve and at the same time the exhaust cam shaft rotates by 180° and a cam opens the exhaust valve to cause expanded fluid vapor to exit through exhaust valve port into the exhaust chamber for removal of exhaust expanded fluid as the piston head rises to top dead center again pushing expanded fluid vapor into the exhaust tube through the check valve and into the radiator to cool and condense the expanded fluid vapor back into expansion fluid and to advantageously generate a negative vapor pressure to assist and pull the piston head back to top dead center to repeat the cycle. The check valve prevents backflow of condensate into the exhaust chamber to maintain a negative pressure and prevent condensate from entering the cylinder expansion chamber. The expansion fluid tank receives condensed expansion fluid from the radiator above the level of the expansion fluid therein to prevent expansion fluid from flooding the radiator. In the closed cycle format of the invention, an expansion fluid pump for pumping expansion fluid from the expansion fluid tank into the thermal mass expansion fluid passageways to repeat the process.

The intake valves and the exhaust valves ride on cams which forces them to open and close against a cam spring compression force in a conventional fashion. A flywheel is attached to the drive shaft connected to one end of the crankshaft preferably extends out of the crankcase through a shaft port to transmit the thermal engine power in the form of torque to any desired mechanical load such as the expansion fluid pump.

In the closed cycle format of the invention, the expansion fluid can be delivered to the thermal mass expansion fluid passageways by the expansion fluid pump. In the open cycle format of the present invention, the expansion fluid can be delivered into the thermal mass expansion fluid passageways by either gravitational potential or by pressurizing the expansion fluid tank. In the closed cycle format, no expansion fluid is lost and the same quantity of expansion fluid remains in the thermal engine cycle in vapor and liquid phase and is reused over and over again by means of condensation and expansion. In the case of an open cycle format the expanded fluid is exhausted into the atmosphere without the need for a radiator.

In general operation of the closed cycle engine, heat is generated and stored in the thermal mass by one of two means. The first means is by passing electric current through resistive heating elements embedded in the thermal mass for a period of time and the second alternative means is by imposing an electromagnetic induction heating means on the thermal mass for a period of time. The thermal engine is started by the engine starter rotating the drive shaft connected to turn a crankshaft. The crankshaft turns the expansion fluid pump which pumps a quantity of expansion fluid from the expansion fluid tank through a flow regulator into the thermal mass expansion fluid passageways. The flow regulator allows only the prescribed amount of expansion fluid to pass into the thermal mass expansion fluid passageways and the rest is returned to the expansion fluid tank by a bypass tube. The heat stored in the thermal mass causes the expansion fluid to expand by a phase change into expanded fluid to generate pressure in the intake chamber. The turning of the crankshaft by the engine starter causes the piston head to move and when it rises to top dead center, the intake cam shaft is positioned to cause a cam to push the intake valve to an open position while at the same time the exhaust cam shaft causes a cam to close the exhaust valve. The pressurized expanded fluid in the intake chamber rushes through intake valve port into the cylinder expansion chamber and pushes the piston head to bottom dead center position turning the crankshaft and thereby rotating the exhaust cam shaft and the intake cam shaft to cause the cams to close the intake valve and also open the exhaust valve. When the intake valve closes the expanded fluid in the cylinder expansion chamber is exhausted by the piston head as it returns to top dead center position using the momentum stored in a flywheel. As the piston head returns to top dead center position, the expanded fluid exits the cylinder expansion chamber into the exhaust chamber through exhaust valve port. The expanded fluid is either transported through an exhaust tube to the radiator in the closed cycle format of the invention, or it is expelled to atmosphere in the open cycle format of the invention through the exhaust tube.

In the closed format of the invention, the radiator cools the expanded fluid vapor back into expansion fluid and a check valve at the end of the exhaust tube generates a vacuum within the exhaust chamber to increase the power of the thermal engine since when the exhaust valve port opens the negative pressure in the cylinder expansion chamber will, in addition to the energy stored in the flywheel, cause the piston head to rapidly return by negative pressure to top dead center position. This adds more power to the thermal engine since the invention essentially teaches the use of expansion fluid in both its pressurized vapor expanded fluid form and its vacuum condensate state to push and return the piston head from top dead center position to bottom dead center position and back to top dead center position. This vacuum assistance is possible in both the open cycle format and the closed cycle format if the exhausted expanded fluid is passed through a long enough exhaust tube before being exhausted to atmosphere. In such a case, the rapid cooling of the expanded fluid in the exhaust tube causes the expanded fluid to undergo a phase change from the vapor phase to the liquid phase and such rapid condensation results in a vacuum being generated momentarily in the exhaust chamber. Thus, by adjusting the length of the exhaust tube, it is possible to regulate the timing of the vacuum formed with the motion of the piston head as moves from top dead position center to bottom dead center position and then back to top dead center position.

At close to bottom dead center the turning of the crankshaft, the momentum stored in the flywheel, and the negative pressure of vapor condensation causes the piston head to rapidly move back towards top dead center to repeat the cycle and to rotate the cam shaft to a position that causes the cam to make the intake valve close while causing the exhaust valve to open. In a closed cycle format of the invention, the pressurized expanded fluid in the cylinder expansion chamber is pushed through the exhaust valve port into the exhaust chamber allowing the expanded fluid to exit the cylinder expansion chamber and through the exhaust tube and check valve into the radiator. Alternatively the expanded fluid can exit the cylinder expansion chamber through the exhaust tube and check valve to bypass the radiator and be expelled directly to atmosphere. The piston head freely returns to top dead center by the continued angular momentum from the rotation of the crankshaft and flywheel allowing the remaining elements of the expanded fluid out of the cylinder expansion chamber into the exhaust chamber and then to cool either in the exhaust tube or in the radiator to and generate a negative pressure of vapor condensation so that the cycle can continuously repeat until stopped. To stop the cycle, the flow regulator is simply closed off to stop the flow of expansion fluid into the thermal battery.

Thermal insulation surrounds the thermal battery case to insulate and prevent loss of heat energy. Preferably, the thermal insulation is made from materials that can withstand extremely high temperatures such as polyamides and ceramics. Such materials are available as wrap around tapes from companies such as Engineered Tapes Inc., and ABS Thermal Technologies in New York. The thermal mass is preferably made from any metal alloys, ceramics, silicates, clays or carbon compounds. Preferably a dense material should be used to achieve a high storage heat capacity in the thermal mass. The heat energy, q, stored in a material of mass m, is proportional to the temperature difference, dt, it undergoes and its specific heat capacity $c_p$ as given by the formula:

$$q = mc_p dt$$

Such dense materials that may be used for a thermal mass include iron, lead, stainless steel, titanium, aluminum, molten salts, carbon composites, fiber glass composites and ceramics. The heat energy storage density is a function of the density of the material since the mass is a function of the density. Examples of the heat storage density of some materials are shown in the table 1 below:

TABLE 1

| Material | Heat storage density $kJ/m^2$ ° C. | Operating temperature range, ° C. |
| --- | --- | --- |
| Aluminum | 2484 | 680 |
| Cast Iron | 3889 | 1151 |
| Ceramics | 2800 | 2000 |
| Taconite | 2500 | 2000 |
| Saltstream ™ 565 | 1960 | 565 |

The expansion fluid tank should be made from durable water and pressure resistant materials such as Aluminum, Stainless steel or Fiber glass including Carbon. Since the expansion fluid tank can be pressurized in some instances, it must be designed to hold adequate pressure and its construction should follow adequate guidelines for manufacture of pressure tanks of the required pressure ratings.

The engine block and engine components can be constructed from metal alloys commonly used in the manufacture of standard combustion engines. However since the thermal loads that the thermal engine is subjected to can be far less that regular combustion engines, it is possible to construct the engine components from aluminum alloys, ceramics, plastics and even carbon fiber materials. If water is used as an expansion fluid, it is even possible to manufacture the engine and its components using high temperature engineering plastics such as mentioned earlier. The design of the cylinders in the cylinder head could be augmented by inserting stainless steel sleeve cylinders to prevent the wear of the plastic due to the friction of the piston head sliding on the cylinder walls.

Advantageously, the use of engineering plastics could make the thermal engine as light as possible to compensate for the additional weight that is needed for the thermal battery. Some other components of the thermal engine such as the cams and the camshaft could also be made from adequate engineered plastics that can withstand mechanical loads and heat. In all the cost of manufacture of the thermal engine can be reduced considerably by a suitable choice of materials.

The engine starter is mechanically coupled to the drive shaft by either a gear or a pulley and belt. The engine starter is preferably an electric starter of conventional design that is operated by an electric battery. It could also be a rope starter similar to conventional pull rope starters used for small combustion engines. In the case when there are multiple piston heads and cooperating cylinders incorporated into the thermal engine, the power stroke of at least one piston head is opposed to the exhaust vacuum stroke of another piston head. In this case, the thermal engine will start when expansion fluid is simply delivered to the thermal battery by opening the flow regulator and turning on the engine starter. Thus the thermal engine may be started by simply opening the flow regulator and allowing expansion fluid to push the piston head in a power stroke to bottom dead center and allowing at least another piston head to come to top dead center to the restart the cycle. Unlike a four stroke engine, the thermal engine can be started by a simple flow regulator acting as the engine starter. In the case of a small engine when the thermal engine could simply be rotated by applying mechanical torque on the drive shaft, the engine starter could simply be a crank that can be manually placed on the drive shaft to turn the drive shaft and start the thermal engine.

The starting of the thermal engine power cycle causes the expansion fluid pump to deliver a quantity of expansion fluid through the flow regulator into the thermal mass expansion fluid passageways and the heat stored in the thermal mass causes the expansion fluid to become heated and to undergo a phase change and become an expanded fluid vapor within the thermal mass expansion fluid passageways. The expanded fluid is under vapor pressure and expands into the thermal battery expansion chamber from where it is transmitted through intake tube under pressure into the intake chamber. The valve cover forms the two fluidly separate chambers that form the intake chamber alongside the exhaust chamber where it abuts the valve block. Every intake valve port is in common fluid communication with the intake chamber and so any intake valve that is open will immediately transmit the pressure of the expanded fluid into the cylinder expansion chamber to push its corresponding piston head from a position substantially at top dead center to bottom dead center, thereby rotating the crankshaft and producing mechanical energy. When the piston head is at bottom dead center and about to rise again to top dead center, the cam causes the intake valve to close and simultaneously causes the exhaust valve to open and to allow the piston head to freely return to top dead center and since every exhaust valve port is in common fluid communication with the exhaust chamber any exhaust valve that is open will immediately transmit the expanded fluid from the cylinder expansion chamber into the exhaust chamber and allow the continued angular momentum and rotation of the crank shaft and flywheel so that the cycle can continuously repeat. Advantageously, the exhaust chamber is fluidly connected to the input of a radiator so that expanded fluid may be condensed therein to generate a negative pressure in the exhaust chamber to generate an additional vacuum force to pull on the piston head as it returns to top dead center position. This additional vacuum force can contribute a substantial torque to the thermal engine during operation. The radiator output enters the expansion fluid tank so that the expansion fluid tank may be subjected to a buildup of a slight vacuum over time. A tank check valve above the expanded fluid level is placed on the expansion fluid tank to prevent any vacuum loss from the expansion fluid tank, but allow any excess pressure from exhausted expanded fluid to exit the expansion fluid tank. During the exhaust stroke, expanded fluid in vapor form may exit the radiator and fill the headspace in the expansion fluid tank but any excess pressure is removed by the tank check valve to prevent back pressure buildup in the exhaust chamber. However, since the exhaust valve is closed at top dead center as soon as the exhaust stroke is completed the vacuum starts to build up again in the radiator and the expansion fluid tank, vapor from prior power strokes has evacuated all the head space of the expansion fluid tank and the vacuum build up in the expansion fluid tank, the radiator and the exhaust chamber and the vacuum thus formed will be used to assist the next exhaust cycle.

Further, a cooling fan may be optionally attached to output shaft to cool the radiator. The thermal engine preferably additionally includes a thermal mass heating means including at least one resistance heating element extending into the thermal mass and a resistance heating element circuit; a power connector for delivering electric current through the at least one resistance heating element and thereby heating the thermal mass. Alternatively, the thermal mass heating means includes an electromagnetic induction heating means to heat the thermal mass by inductive heating; said electromagnetic induction heating means either may be incorporated as part of the thermal mass or may be a separate unit from the thermal mass so that the thermal mass may be heated quickly and non-intrusively by an external electric power source. The thermal mass optionally includes part of the engine block. The external electromagnetic induction heating means may be an induction coil proximally placed to heat the thermal mass without any contact with the thermal mass, so that in the event that the thermal engine is installed in a vehicle or mobile device, the thermal mass can be heated quickly by just passing through the vehicle or mobile device through the electromagnetic field of such the electromagnetic induction heating means without contact. To take advantage of as large a thermal mass as possible the thermal mass may additionally include the material the engine made from so that if insulated, the thermal loss can be minimal. It is important that the intake chamber be insulated as much as possible so that the expanded fluid vapor retains as much heat as possible before it is introduced into the cylinder expansion chamber. It is important that the exhaust chamber not be insulated so that as much heat can be taken out of the expanded fluid vapor to reduce it to expansion fluid liquid after it has done its work.

The thermal engine preferably operates on a noncombustible expansion fluid such as water or a refrigerant fluid; it is important that the expansion fluid have as high a heat of vaporization as possible. Water and refrigerants such as ammonia have the highest heat of vaporization per kilogram. Some examples of heat of vaporization are given in table 3 below:

TABLE 2

| Compound | Heat of vaporization (kJ mol$^{-1}$) | Heat of vaporization (kJ kg$^{-1}$) |
| --- | --- | --- |
| Methane | 8.19 | 760 |
| Ethanol | 38.6 | 841 |
| Methanol | 35.3 | 1104 |
| Ammonia | 23.35 | 1371 |
| Water | 40.65 | 2257 |

The thermal engine additionally includes an expansion fluid tank in fluid communication with thermal mass expansion fluid passageways. A expansion fluid pump supplies expansion fluid from the expansion tank to the thermal mass expansion fluid passageways so that when the expansion fluid enters the thermal mass expansion fluid passageways it expands quickly and pressurizes the thermal battery expansion chamber with uniform vapor pressure. This way the vapor pressure is constantly transmitted from the thermal battery expansion chamber to intake valve to feed all the cylinders as needed. Thus as each intake valve opens, the pressure is readily available to power the piston head and run the engine. Thus unlike conventional engines, the intake chamber is always under pressure and all the intake valves are subjected to this pressure so that when each opens it is fed pressurized expanded fluid from the intake chamber. In this way, there is very little fluid regulation needed to ensure adequate operation of the thermal engine.

In accordance with the present invention, a thermally charged thermal battery is used to generate mechanical energy by a phase change of a liquid such as water. The thermal energy causes the expansion fluid to expand into a gas by a phase change and thus permits the thermal engine to run like a conventional engine without much change to the engine configuration.

An object of the prevent invention is to provide a thermal engine which can be operated with an expansion fluid having the most suitable thermodynamic properties to achieve a high degree of efficiency during operation. An engine of this kind, in accordance with the invention, can be optimized by its geometry through maximizing the thermal mass and minimizing the surface area of the thermal battery for storing a maximum amount of thermal energy in the form of a direct heat.

Essentially, a heat storing thermal battery is incorporated into the engine which permits energy to be stored thermally instead of chemically as in the case of a conventional electric battery. Advantageously, the entire engine block can be used as a thermal source in the form of a thermal mass, so that a large amount of thermal energy can be stored for later use. The thermal battery can be charged with heat to a high temperature using electric heaters, electromagnetic induction heaters or other forms of heat generators incorporated into of the thermal battery. For example a solar powered heat generator such as a lens can be used to focus heat on the thermal battery during charging to reduce the cost of using conventional electric energy sources. In the case when a fluid can undergo a phase change with very little heat, it is possible to use very low temperature thermal heating means to store energy in a thermal battery. It is possible that with the advances in nuclear technology that a miniscule and well protected thermonuclear heating means could be incorporated into a well-protected radiation shielded thermal battery. In case of emergencies, it is possible to use a chemically based heating fuel to generate heat that can be stored in the thermal battery.

Moreover, the exhaust from the thermally expanded fluid from the thermal engine can be cooled to generate a reverse condensation liquid phase vacuum that could assist in the return cycle by pulling on the piston head when it is at top bottom center. In such a case, the maximum potential of the expansion fluid during condensation and creating a vacuum could be used in conjunction with its expansive energy. An expansion fluid such as water can be injected into the thermal mass of the thermal engine to generate steam and power the thermal engine. Optionally, a combination of water and ethanol and other fluids may be used as an expansion fluid. Advantageously, much more energy can be stored in such a thermal battery than in a conventional electric battery of the same weight. This can be demonstrated by simply exhausting the electrical energy of an electric battery of a given mass to heat up a thermal mass of the same mass.

It is important note that there exist other types of electrical thermal batteries which use liquid lithium and other salts as electrolytes. These existing electrical batteries are only suitable for storing electrical energy. The present invention is a true thermal battery which can be used to supply heat and electrical energy stored in the form of heat and electrolyte simultaneously. Advantageously, the present thermal battery can be used in conjunction with a molten electrolyte contained within the battery as a thermal mass to store both heat potential energy and electric potential energy simultaneously. Without limiting the scope of the invention, however, the preferred mode of operation is in a pure thermal mode wherein the thermal battery is simply a thermal mass.

A liquid such as water can be used as an expansion fluid, and part of the thermal mass can be projected into the cylinder to create an additional thermal storage source for generating efficient vapor phase change. If the entire engine block is used as a thermal mass, additional thermal energy can be stored by proper design and insulation of the entire thermal engine. Additionally, the expansion fluid itself can store thermal energy by heating it to a temperature just below its phase change point. By pressuring the expansion fuel tank the boiling temperature of the expansion fluid could be substantially increased so that it can be heated to a temperature higher than its regular boiling point before it is exposed to the thermal mass. The expansion fluid in the expansion fluid tank may be heated by tank electric heaters so that during charging, the expansion fluid may also be pre-charged with thermal energy to near its boiling point to increase its thermal potential.

The supply of the expansion fluid quantities can be controlled by means of electronics controlling the expansion fluid pump so that an exact metering of the expansion fluid can be achieved which has at least a level of control for the different thermodynamic properties of different expansion fluids.

The thermal battery case is preferably made from materials that have a high thermal resistance and melt temperature. Ceramics could be used to ensure that the thermal mass can be taken to the highest possible temperatures without melting the thermal battery case. The thermal battery could be either separate or incorporated into the design of the engine block. In the case when it is incorporated directly into the engine block the thermal battery case could be incorporated as part of the design of the engine block with the thermal battery expansion chamber directly incorporated as part of the engine block.

The thermal battery vacuum chamber must be designed to maximally surround the thermal mass so that no heat can be transmitted by conduction or convection from the thermal mass to the thermal battery case by conduction or convection. Where possible, the conductive portions where the thermal mass contacts the thermal battery case should be minimized so that the thermal mass is essentially suspended inside the thermal battery vacuum chamber by minimally conductive members. A vacuum resistant material should be used to construct the thermal battery case to prevent the loss of vacuum, thus preferably the thermal battery casing could be made from glass or from a metal alloy of suitable properties. The outer thermal insulation of the thermal battery case should be designed for minimal radiation. Preferably, the interior wall of the thermal battery vacuum chamber should be reflective to heat so that radiation is stored inside of it by reflection with minimal losses. The thermal battery case could be made from thermally insulating materials so that as much heat is stored within the thermal battery as possible. The thermal battery vacuum chamber should be evacuated to a high degree to avoid heat loss during operation. All fluid delivery passages and tubes should be insulated to a very high degree to prevent heat loss and their lengths should be minimized as much as possible.

Since there is no need to compress a fluid for firing and combustion, all the engines should be designed as two stroke engines, with a single stroke for a power stroke and a single return stroke for an exhaust stroke. In the preferred embodiment, pressurized expanded fluid enters the intake chamber and serves all the cylinder expansion chambers simultaneously. This reduces the complexity of the expanded fluid control system since the expanded fluid inside the intake chamber is always pressurized during operation and ready to feed pressurized expanded fluid into each cylinder expansion chamber when its intake valve opens. Each intake valve opens when its piston head is at its top dead center and again closes when its piston head is at bottom dead center. Each exhaust valve opens when its piston head is at its bottom dead center and again closes when its piston head is at top dead center. The exact position when the valves open could be adjusted to compensate for lag in the delivery rate of the expanded fluid and the exhausted rate of the expanded fluid. In some cases, it is possible to isolate each cylinder to have its own intake chamber and its own exhaust chamber. In this case, it is possible to rearrange the power strokes of each piston head so that they can be sequenced as necessary to maximize the power outtake of the thermal engine.

A flywheel is essential to keep the cycle going since very little power is generated during the motion of the piston head from bottom dead center to top dead center even though if a vacuum is maintained in the exhaust chamber a substance force could be generated to assist the return of the piston head. In the case when a closed cycle thermal engine is built the exhausted expanded fluid vapor should be cooled in a non-resistive radiator. The passageways for the expanded fluid vapor in the radiator should be free from any back pressure and the radiator should be able to quickly remove all the heat of condensation from the expanded fluid so that it can quickly condense to expansion fluid and thus recycled as quickly as possible before losing most of its heat. In fact the heat removed by the radiator should be equal to the heat of condensation of the expanded fluid so that the liquid phase of the expansion fluid remains as close to its boiling point as possible. This ensures that very little heat is taken from the thermal battery by the expansion fluid to re-expand it to a vapor phase. The expansion fluid tank could be incorporated as part of the exhaust tube of the radiator. This way the expansion fluid is stored in the exhaust tube as opposed to using a separate expansion fluid tank for the same purpose. The condensate expansion fluid from the radiator can be held in a segment of exhaust tube which will act as an expansion fluid tank to minimize the size and complexity of the thermal engine, and more importantly to minimize the exposure of the condensed expansion fluid to the atmosphere. The expansion fluid from the expansion fluid tank can then be transferred directly by the expansion fluid pump to the thermal mass expansion fluid passageways for reuse as needed. If the radiator is large enough, the condensate could be taken directly from the radiator output and reused as the expansion fluid so that it can act directly as the expansion fluid tank itself.

In the case when an open cycle thermal engine is built the exhausted expanded fluid vapor could be exhausted directly to the atmosphere and not reused. The most suitable expansion fluid for this purpose is water since it is environmentally friendly. In the open cycle format of the invention, the thermal engine is provided with an expansion fluid tank that can store an adequate amount of expansion fluid for the required period of use of the thermal engine. Then, the exhausted expanded fluid could be passed through a radiator or simply expelled to atmosphere as vapor. The radiator could be a simple coiled exhaust tube that could be incorporated with a check valve at its end that only allows fluid to pass to atmospheric pressure so that as the expanded fluid is exhausted it cools inside the exhaust tube and condenses to a liquid phase to form a vacuum in the exhaust tube and the exhaust chamber and the check valve closes to maintain the vacuum. The vacuum subjects the exhaust valve to a negative pressure that can be used to assist the piston head to rise to top dead center when the said exhaust valve is opened. When the vacuum subsides during the power cycle, the check valve relaxes and opens and water is expelled into the atmosphere. This way, only liquid water is exhausted as a wasted fluid from the engine. No radiator may be needed if there is an adequate supply of expansion fluid, but the returning expansion fluid is hot and its reuse of can assist in reducing the energy drawn from the thermal battery. In such a case, the condensed expansion fluid can be recaptured in the expansion fluid tank under atmospheric conditions. In the open cycle embodiment of the present invention, the expansion fluid tank should be in fluid communication with the atmosphere so that no back pressure is generated by the exhausting expanded fluid, and if the radiator becomes too hot, the expanded fluid vapor can simply escape from expansion fluid tank to atmosphere without generating a back pressure on the intake chamber. In yet another embodiment of the open cycle, the radiator could be submerged inside the expansion fluid in the expansion fluid tank to exchange heat directly with the expansion fluid stored therein. This allows a lot of the exhaust heat to be captured. However if this is done it is important that the output of the radiator exhaust be above the liquid level so that in the case of a vacuum being generated by the condensate, the expansion fluid will not be sucked backwards into the exhaust chamber.

While the invention can be used only with a noncombustible phase change liquid such as water it may also be used in combination with or separately with a potentially combustible expansion fluid that have a high expansion value.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
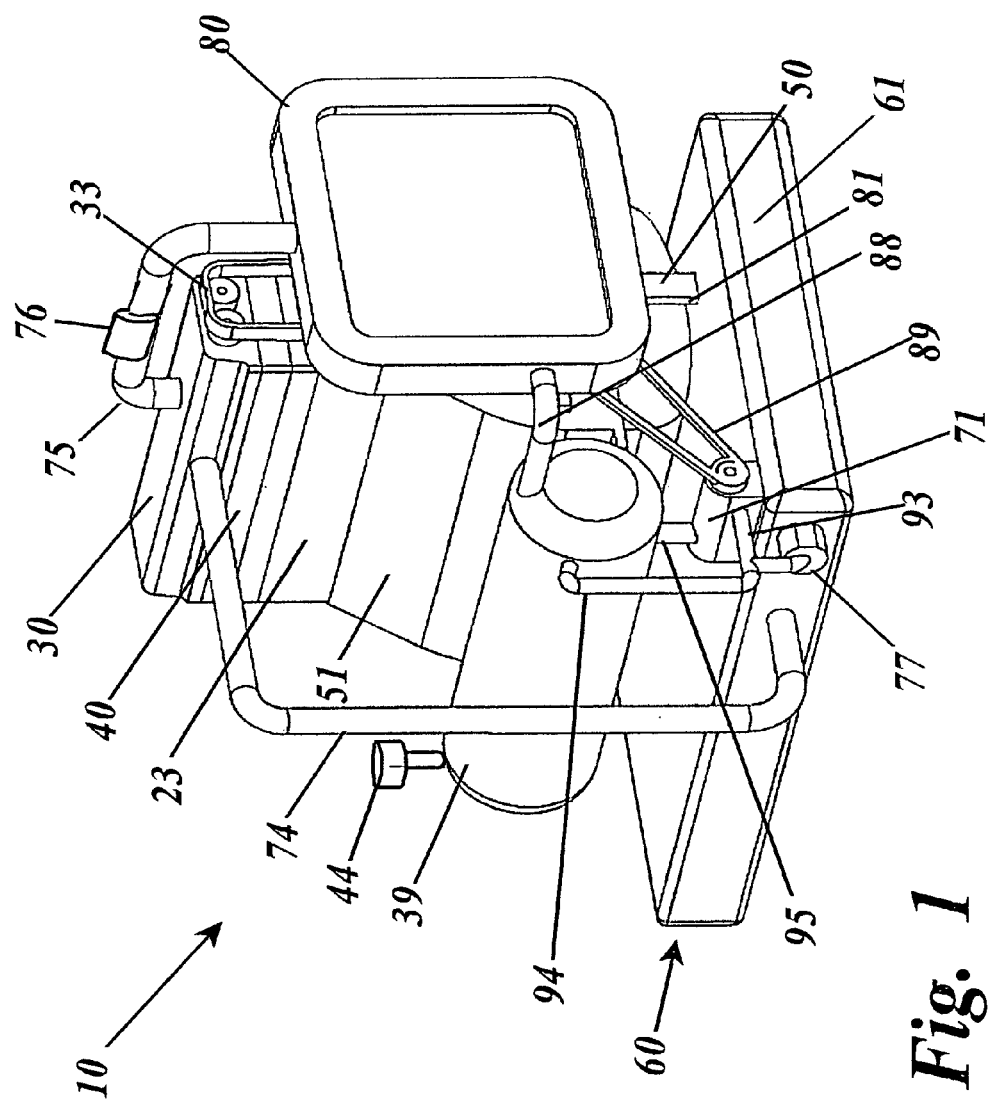
FIG. 1 is shows the thermal engine, the expansion fluid tank, the radiator, the pump, and the flow tubes with a thermal battery acting as a mount for the engine block.
Figure 2:
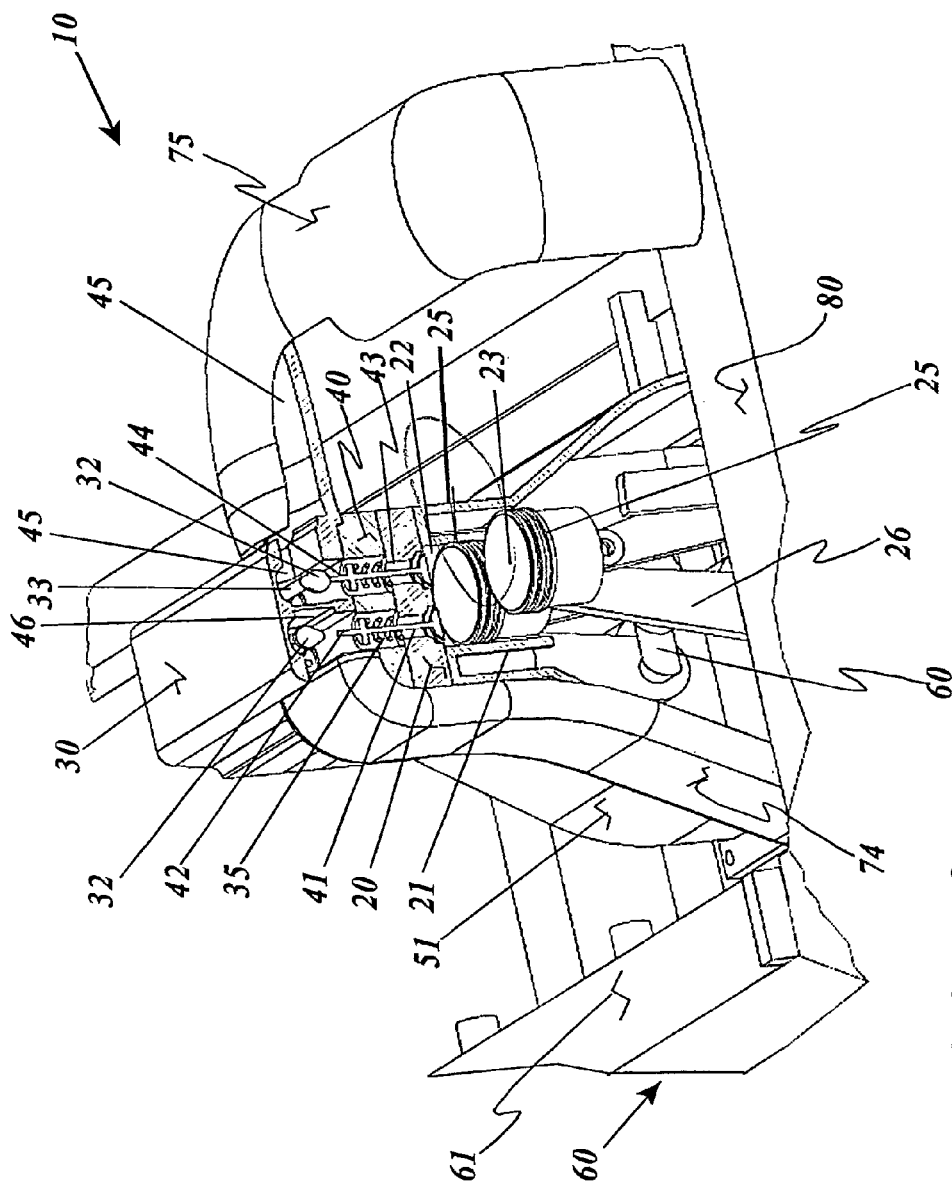
FIG. 2 shows a cut away view of some areas of the thermal engine showing the relational aspects of the intake valves, the exhaust valves, the piston heads, the piston cranks, the cylinder expansion chamber, the exhaust chamber and the cylinder head intake chamber.
Figure 3:
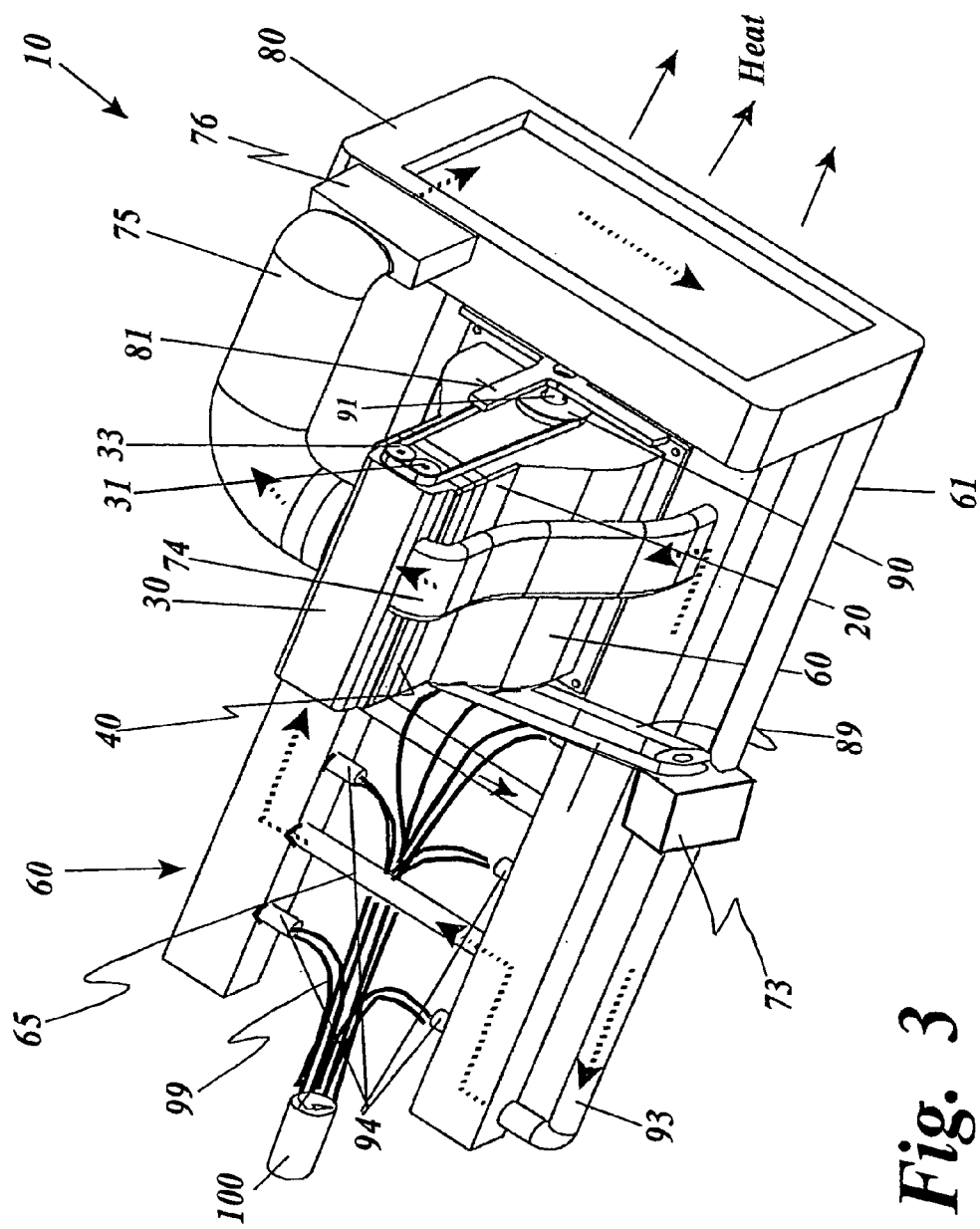
FIG. 3 shows the thermal engine, the expansion fluid pump, the radiator and some of the electric heating elements in relation to a thermal battery for mounting beneath a thermal engine.
Figure 4:
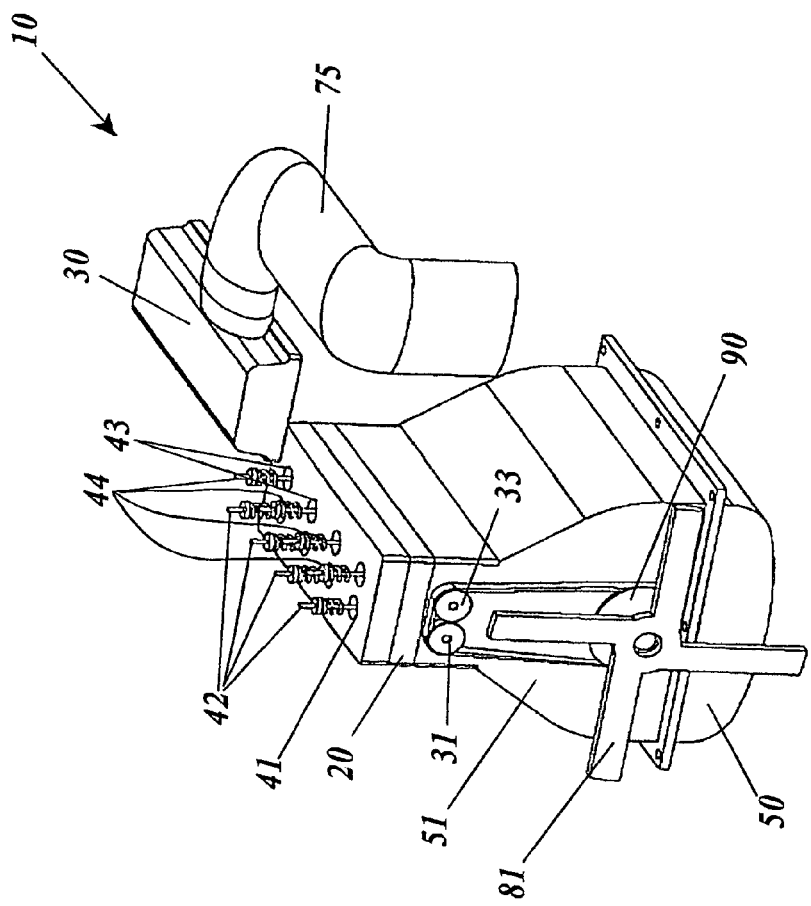
FIG. 4 shows the engine intake and exhaust valves and the cooling fan of the thermal engine.
Figure 5:
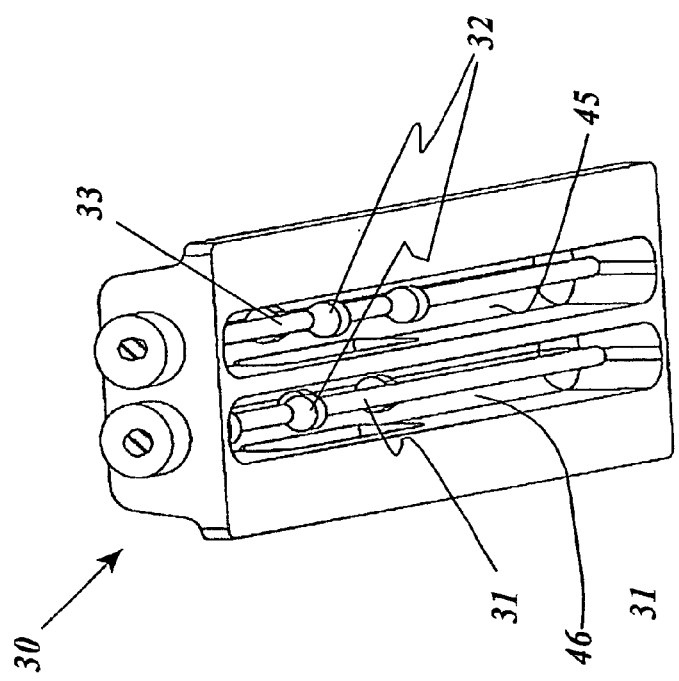
FIG. 5 shows the cam shaft and the cams for operating the intake and exhaust valves
Figure 6:
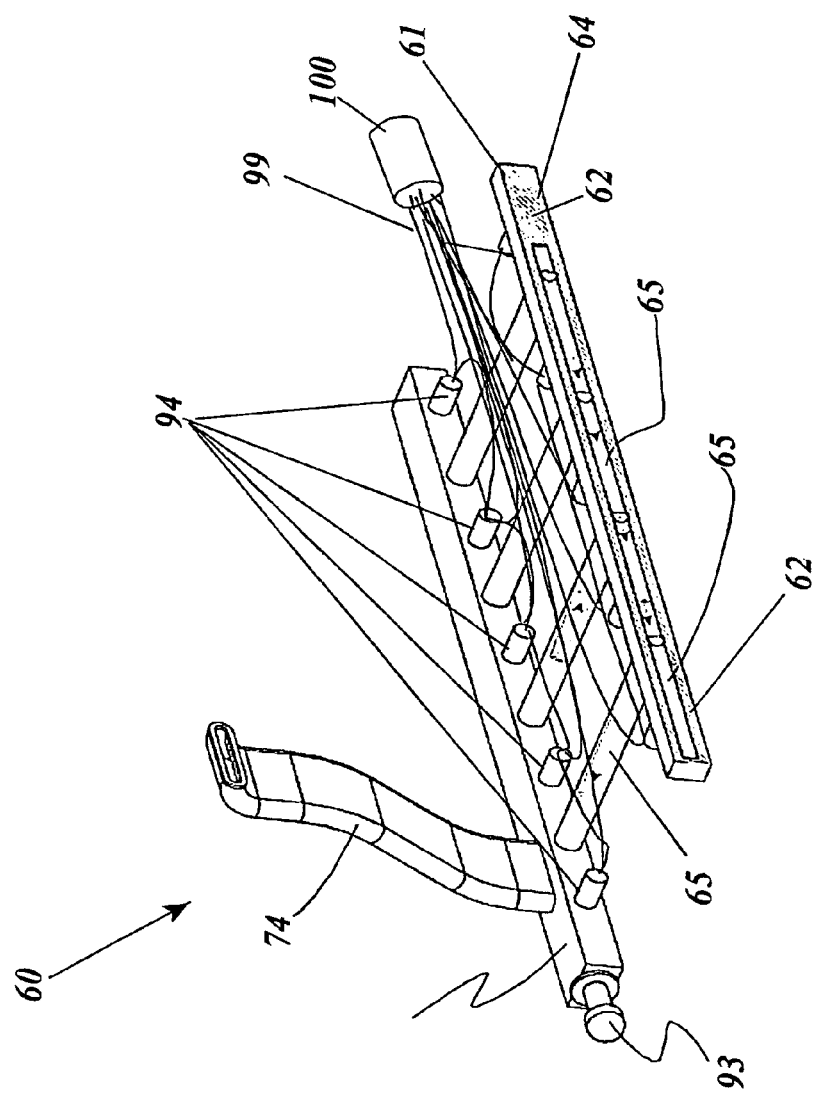
FIG. 6 shows a cut away view of a portion of a linear thermal battery with thermal battery expansion passage ways, the heating elements and the expanded fluid delivery means. This version is a linear thermal battery that has the casing around it and mounts to the base of an vehicle or engine mount.
Figure 7:
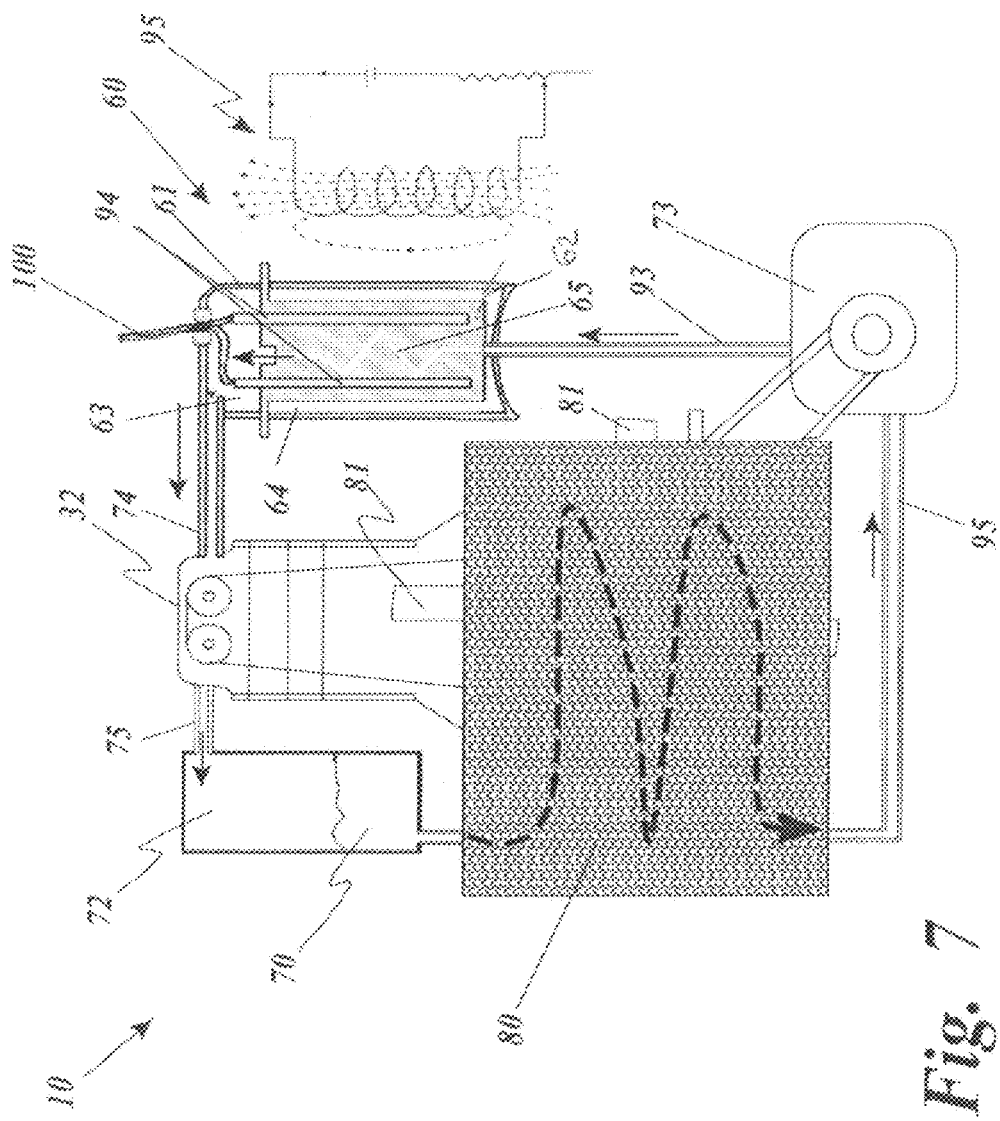
FIG. 7 shows the thermal engine, a pump, a radiator, a thermal battery, with a cutout view of a version of the thermal battery and its thermal battery expansion chamber and thermal mass expansion fluid passageways. The radiator circuit is simulated and the path of the fluid cycle is shown by broken line arrow.
Figure 8:
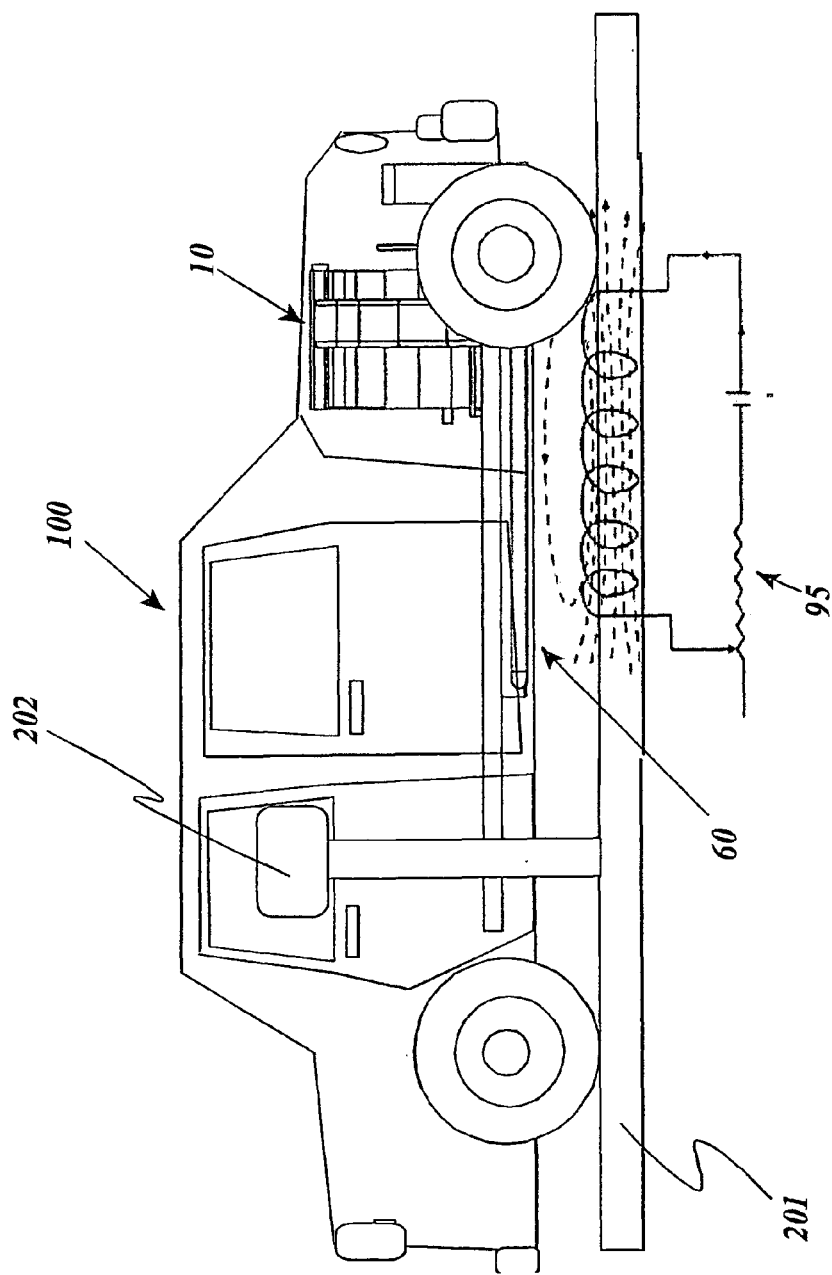
FIG. 8 is a drawing showing a thermal engine beneath a vehicle being charged by electromagnetic induction heating means under the road. It also shows a trigger sensor that senses the arrival of the vehicle.
Figure 9:
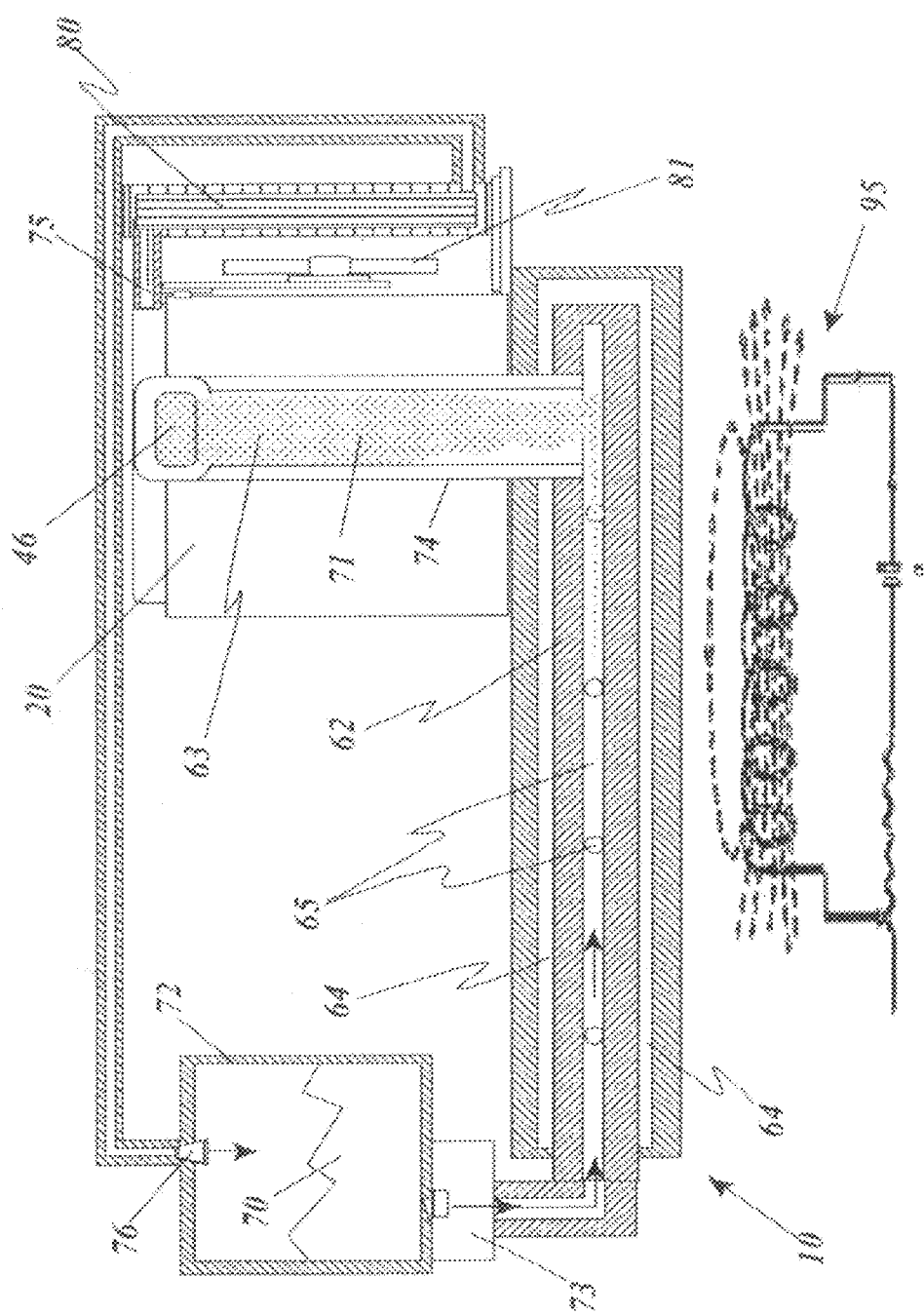
FIG. 9 shows a cross section of a thermal battery which is mounted to the base of the vehicle and is being heated by an electromagnetic induction heating means. The expansion fluid tank, radiator, engine block and fan are shown in the background.
Figure 10:
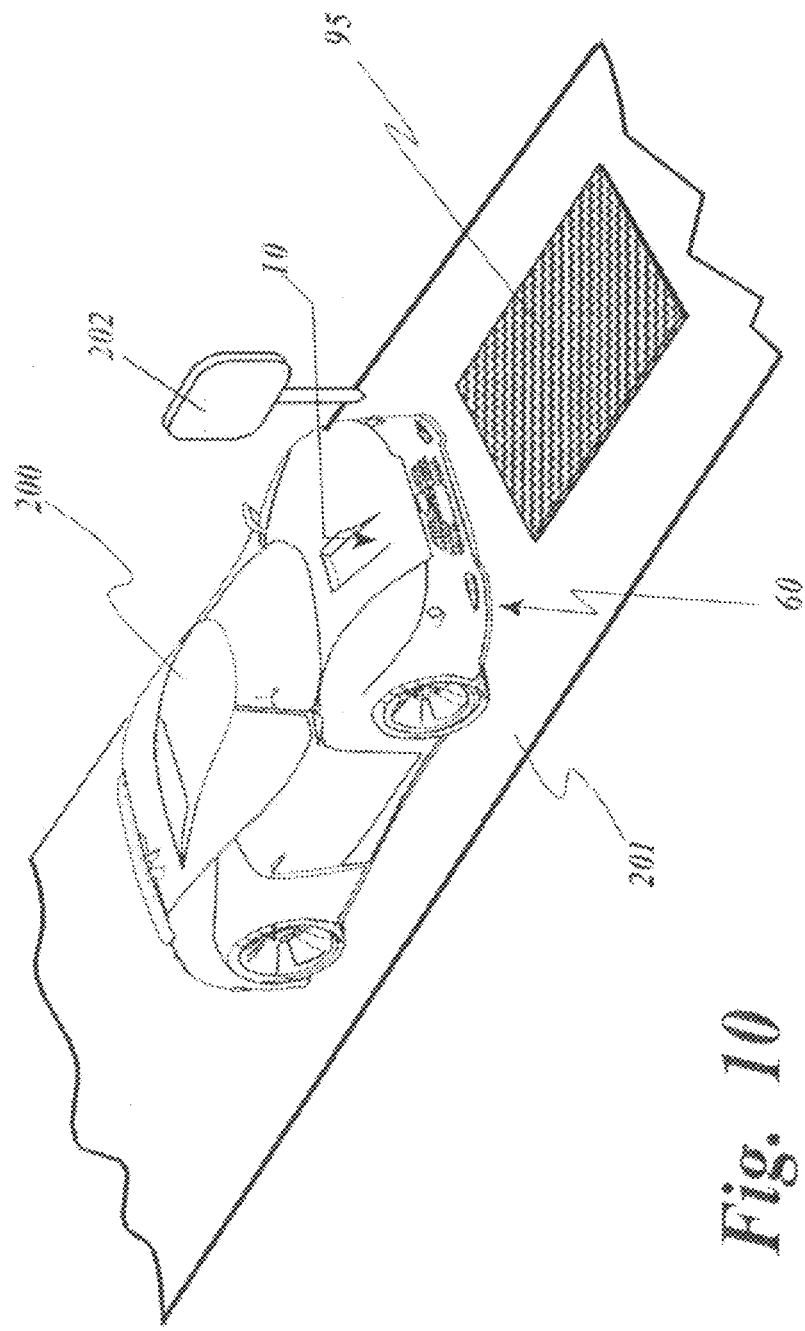
FIG. 10 shows a vehicle being thermally charged as it passes through electromagnetic induction heating means positioned beneath the roadway. A sensor is shown to activate the charging.
Figure 11:
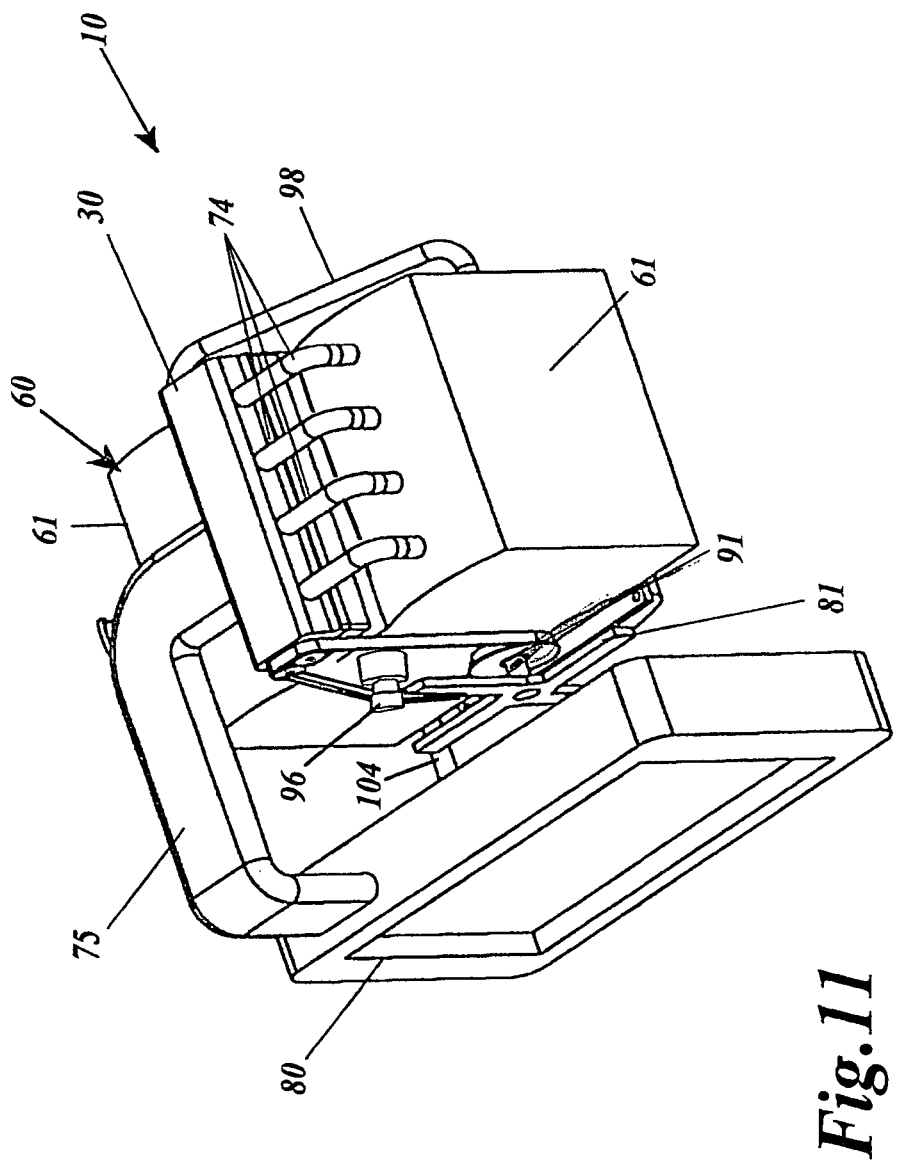
FIG. 11 shows a version of the thermal engine with the thermal battery incorporated as part of the engine casing and the radiator being cooled by the engine fan.
Figure 12:
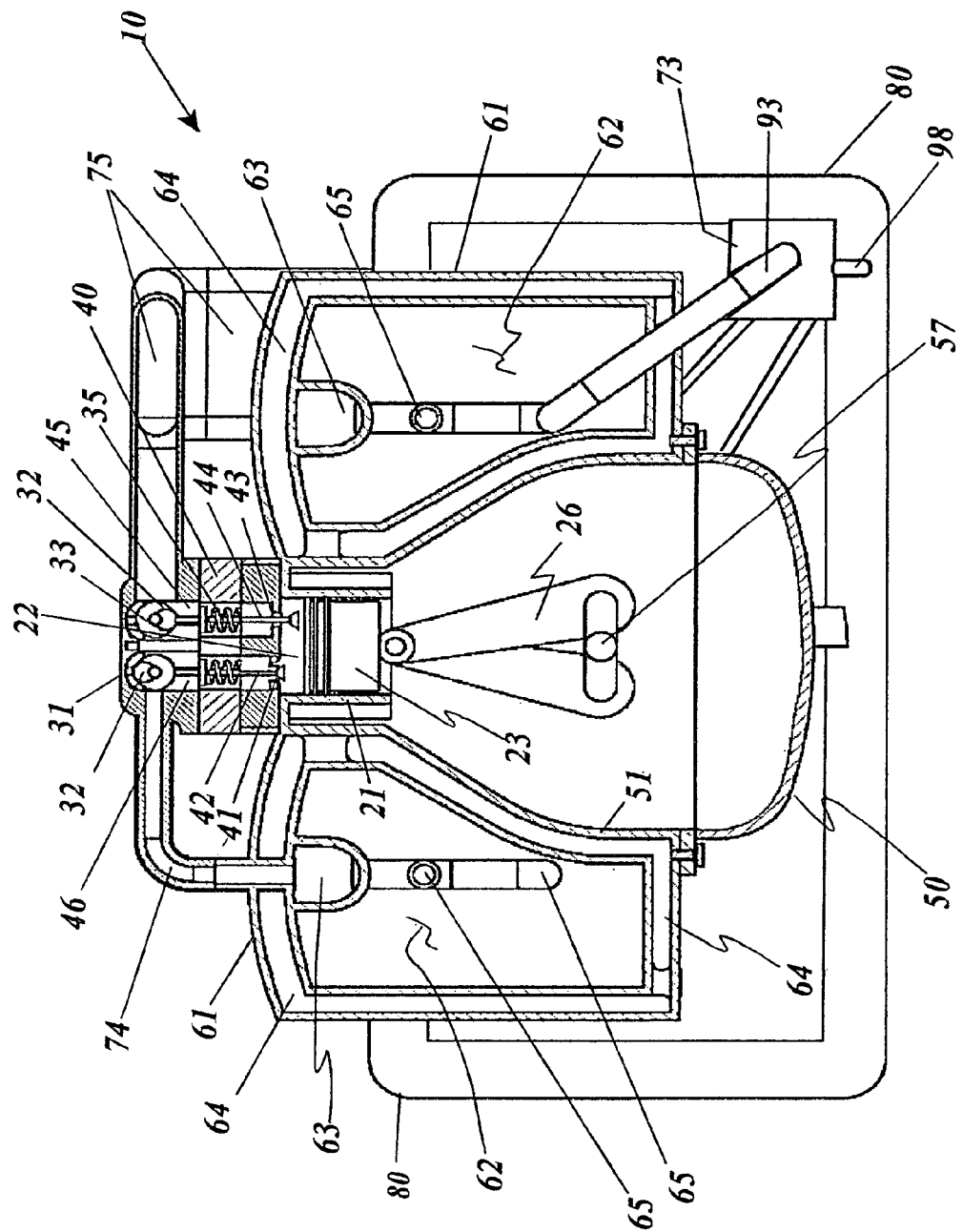
FIG. 12 is a cross section of the thermal engine with a view of the internal structure of one embodiment of the thermal battery, the thermal battery casing, the thermal battery vacuum chamber, the intake and exhaust cylinder head chambers, the valve block, the cylinder, the crankcase, the piston and the engine crank and sump. The valves are shown with the cams, the cam springs and the cylinder expansion chamber. The radiator is shown in the background with the expansion fluid delivery means through a pump from the radiator into the thermal mass expansion fluid passageways.
Figure 13:
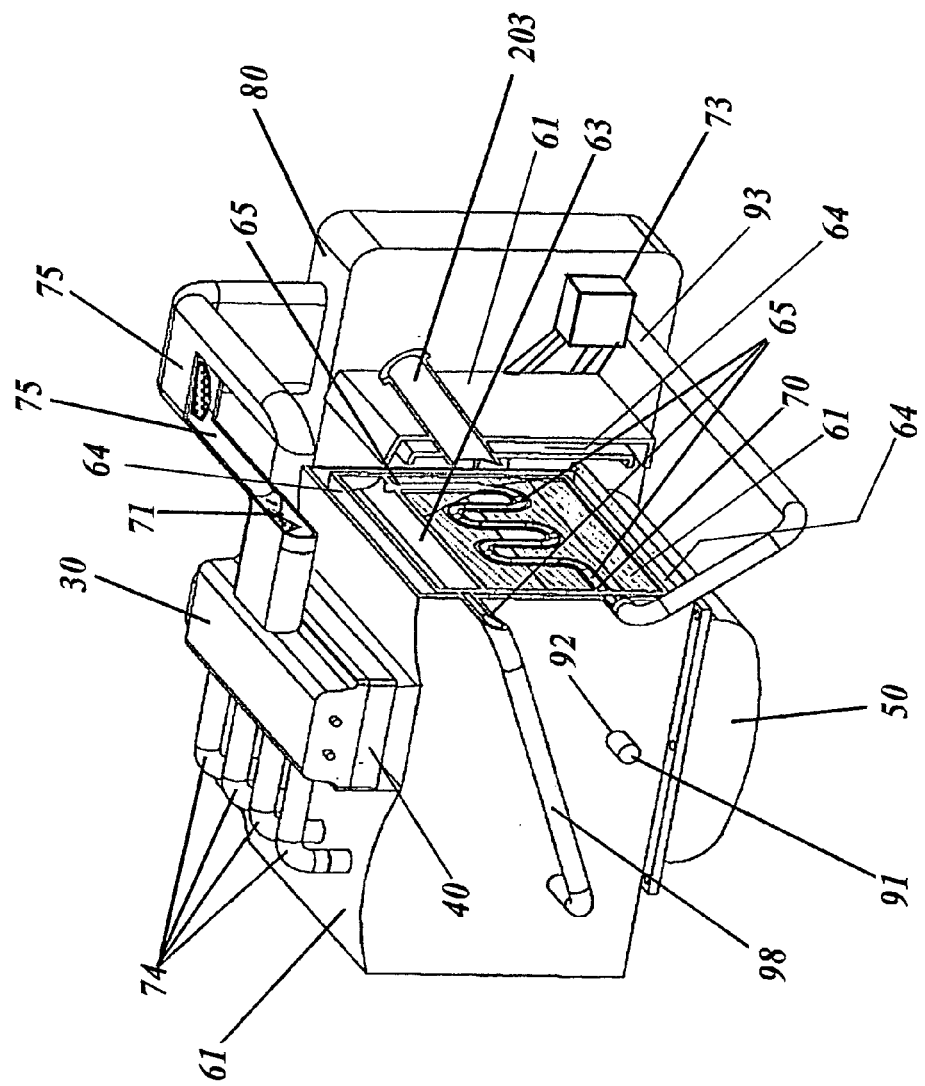
FIG. 13 shows the thermal engine with a cut away view of a part of the thermal battery casing showing the thermal mass expansion fluid passageways, the pump, and a spout entering into the thermal battery for electromagnetic induction heating means to enter into and charge the battery.
Figure 14:
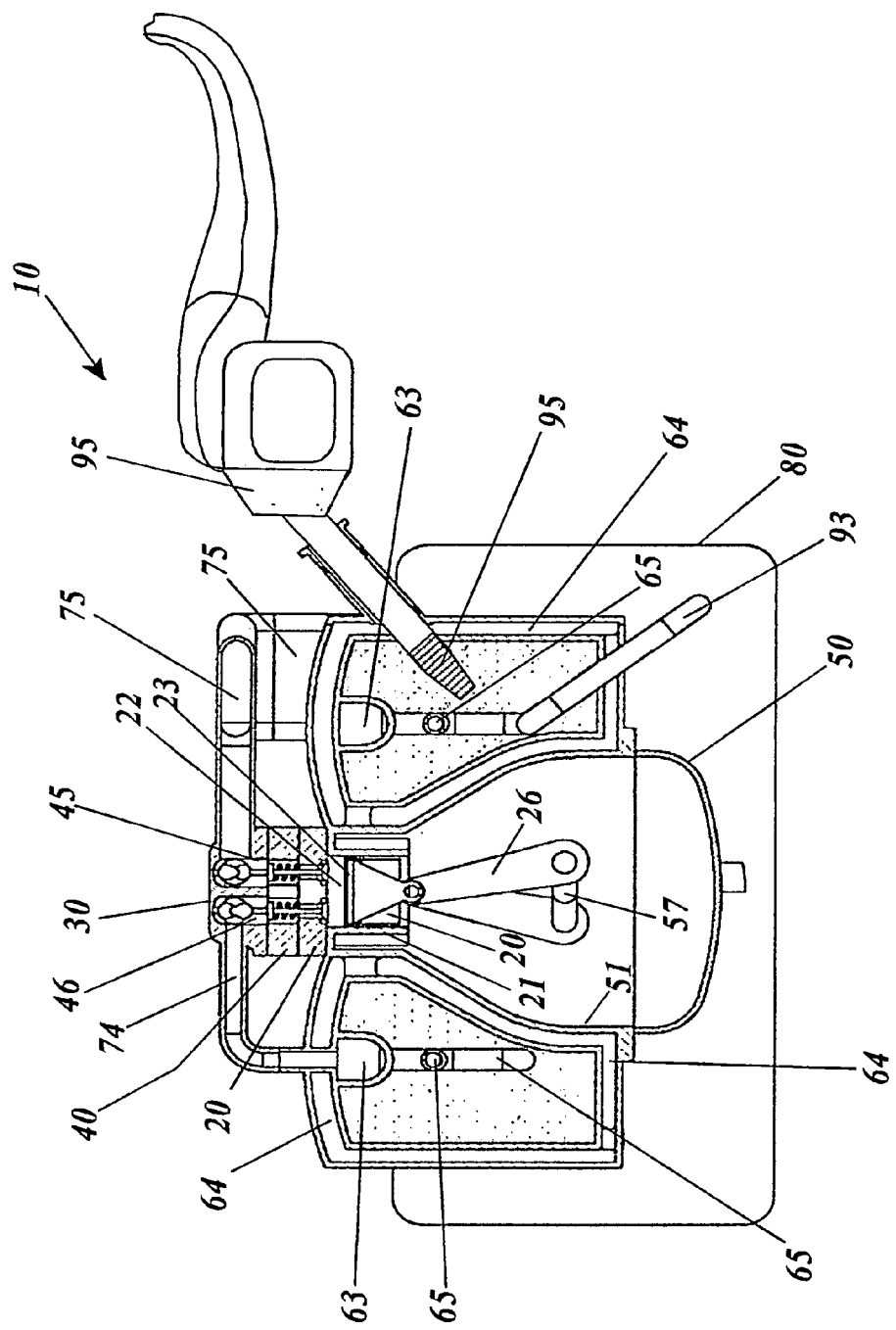
FIG. 14 shows a cutaway view of the thermal engine with the thermal battery being heated by an electromagnetic induction coil in the form of an intruding cylinder into the thermal battery. The thermal battery is shown surrounding the engine block.
Figure 15:
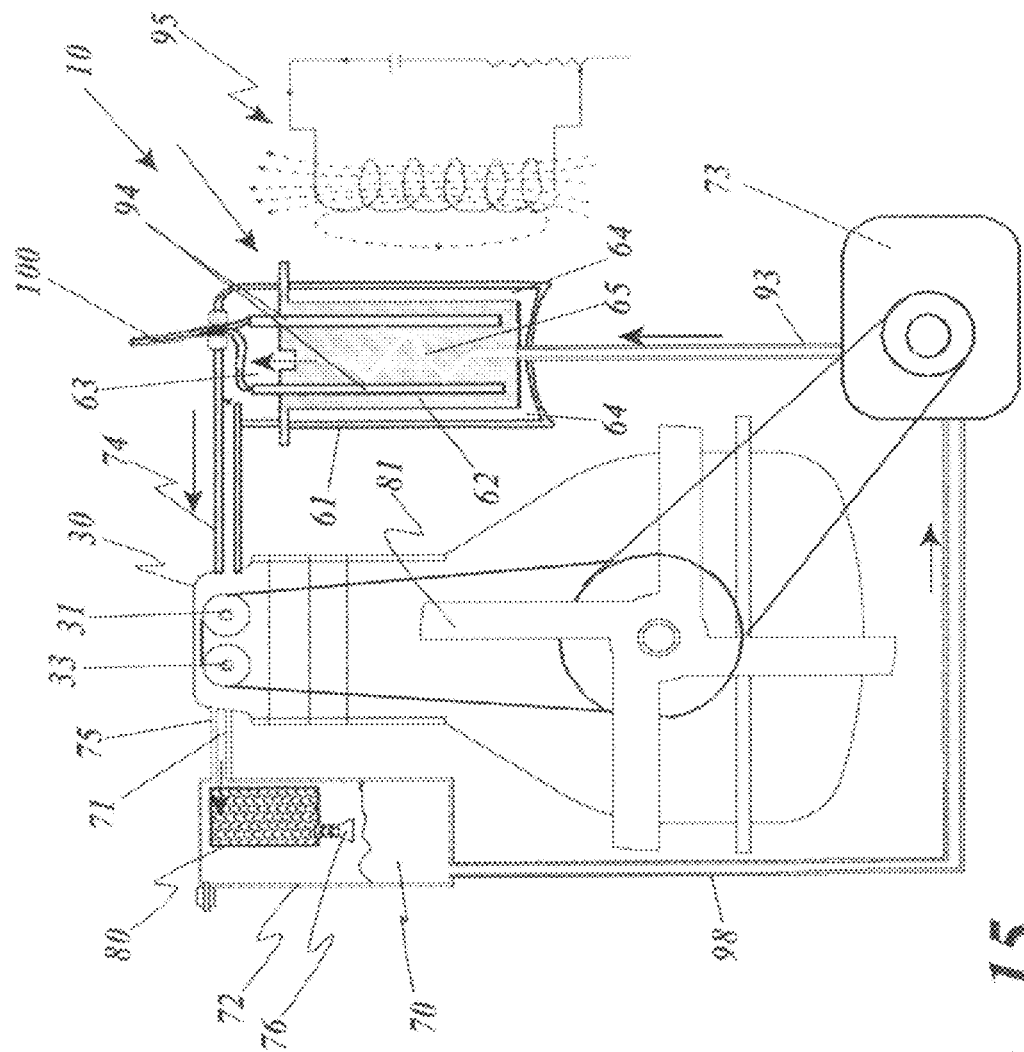
FIG. 15 shows the thermal engine in an open cycle configuration with the radiator returning expansion fluid into the expansion fluid tank for reuse.
Figure 16:
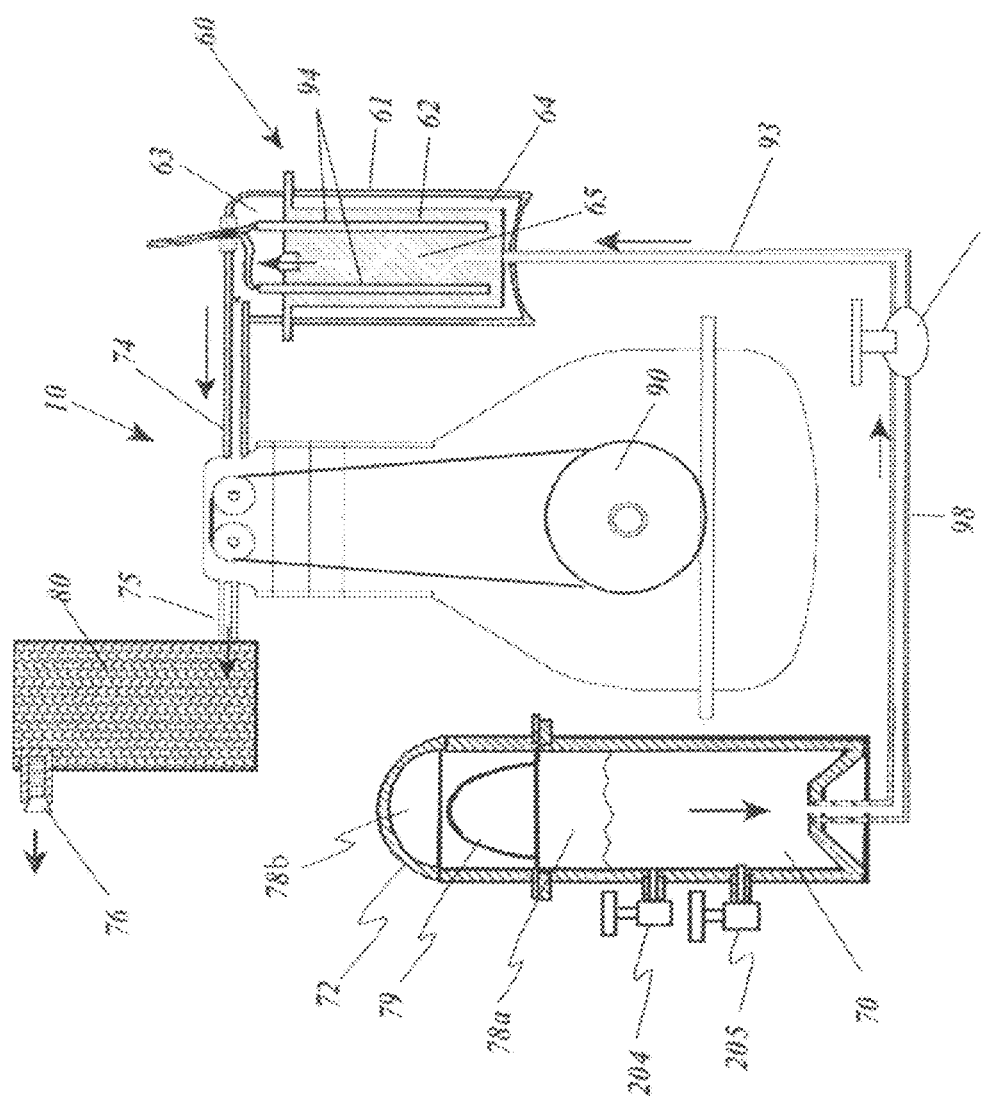
FIG. 16 shows a cross section of parts of the thermal engine in an open cycle configuration with a pressure tank acting as a pumping means for expansion fluid, a radiator for cooling the exhaust and a thermal battery.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

More specifically the present invention relates to a thermal engine 10 such as for powering a vehicle 200, including a cylinder 21 and a piston 24 having a piston head 23 and a piston crank 26 and an insulated thermal battery 60 including at least a thermal mass 62 such as a metal block for storing and retaining heat to cause expansion fluid 70 to expand inside the a cylinder expansion chamber 22 between the cylinder head 25 and the piston head 23 to drive a crankshaft 57.

Since the anticipated operating temperature of the thermal expansion fluid 70 depends on it boiling point, except for the thermal battery 60, the remaining thermal engine 10 can be constructed from durable materials such as aluminum and a suitable plastic material such as polypropylene or peek. In its most basic form, as mentioned above generally, the thermal engine 10 incorporates several conventional engine elements including valve cover 30 sealingly mated to a valve block 40 sealingly mated to an engine block 20 with a crank case 51 that is sealingly mated to a sump 50. These components of the thermal engine 10 could be injection molded from suitable plastics and then lined with stainless steel inserts in areas where wear might be a problem.

The engine block 20 has one or more longitudinal spaced cylinders 21 bored through it with axes perpendicular to its open face within each of which a piston head 23 is slidably and sealingly retained to form a variable volume cylinder expansion chamber 22 between the piston head 23 and the valve block 40. The other end of the engine block 20 is sealingly connected to thin walled crank case 51. The anticipated operating temperature of the engine block 20, the valve cover 30, the valve block 40, the crank case 51, the sump 50 and the piston head 23 is below the melt point of most plastics and so these components could be constructed from durable plastics such as Peek, Vespel® SP-1 Polyimide, Meldin® 7001 Polyimide, Kapton® Polyimide, Kaptrex® Polyimide, Torlon® 4203, Vestakeep® PEEK, CeramaPEEK®, Ryton®—PPS-40% Glass-Filled and Celazole® PBI. Celazole® PBI offers the highest heat resistance and mechanical property retention over 400° F. well above the boiling point of water. However for durability metal alloys and ceramics may be used for their construction. The cylinder 21 could be lined with stainless steel sleeves to prevent wear due to the sliding motion of the piston head 23. The piston head 23 has piston rings 25 that form an adequate slide seal with the cylinder 21. A crankshaft 57 is mechanically linked to the piston head 23 opposite the valve block 40 by a piston crank 26.

The valve block 40 has intake valves 42 ports 41 with intake valves 42 and the same number of exhaust valve ports 43 with exhaust valves 44 for fluid communication with the cylinder 21 in the engine block 20; the valve cover 30 sealing forms an intake chamber 46 and an exhaust chamber 45 over the intake valves ports 41 and the exhaust valve ports 43 respectively. The intake chamber 46 is fluidly connected to receive expanded fluid 71 through an intake tube 74 from a thermal battery 60; the exhaust chamber 45 is fluidly connected to an exhaust tube 75 at the end of which is a check valve 76 that only allows exhaust expanded fluid 71 from the exhaust chamber 45 to exit the exhaust tube 75. A radiator 80 may be optionally placed after the check valve 76 to cool and condense exhausted vapor from the exhaust chamber 45. A thermal battery 60 consisting of a contiguous thermal battery case 61 divided into two separate fluid chambers by a thermal mass 62 for storing heat energy, the first chamber consisting of a thermal battery expansion chamber 63 in fluid communication with the intake chamber 46 an expansion fluid tank 72, an expansion fluid pump 73 for delivering expanded fluid 71 from the expansion fluid tank 72 into a thermal battery 60, the thermal battery 60 consisting of a contiguous thermal battery case 61 divided into two separate fluid chambers by a thermal mass 62 for storing heat energy, the first chamber consisting of a thermal battery expansion chamber 63 in fluid communication with the intake chamber 46 and the second chamber consisting of a hermetically sealed thermal battery vacuum chamber 64 surrounding most of the thermal mass 62, said thermal battery expansion chamber 63 having thermal mass expansion fluid passageways 65 within said thermal mass 62 for accepting expansion fluid 70 from the expansion fluid pump 73 to uniformly heat and expand expansion fluid 70 from a liquid phase to an expanded fluid 71 in the vapor phase within the thermal mass 62, the thermal mass expansion fluid passageways 65 fluidly connected to transmit and accumulate pressurized expanded fluid 71 vapor into the thermal battery expansion chamber 63 and then into the intake chamber 46. The thermal battery case 61 must be made from heat resistant and low expansion materials such as ceramics and metal allows. It cannot be made from plastic or aluminum since it must withstand very high temperatures.

An exhaust cam shaft 33 is axially positioned inside the exhaust chamber 45 with a cam 32 mounted thereon above each exhaust valve 44. An intake cam shaft 31 is axially positioned inside the intake chamber 46 with a cam 32 mounted thereon above each intake valve. Both cam shafts are suitably mechanically attached by a drive belt or gear system to a drive shaft 91 at the end of the crankshaft 57. An engine starter 96 is also connected to drive shaft 91 to rotate the drive shaft 91 when the thermal engine 10 is started.

The thermal engine 10 further comprises an expansion fluid tank 72 that is fluidly connected to the radiator 80 by a tank return tube 88 in a closed cycle format of the invention. In a closed cycle format, the radiator 80 condenses expanded fluid 71 vapor back to expansion fluid 70 which is taken to the expansion fluid tank 72. An intake tube 74 connects the expansion fluid tank 72 to the thermal mass expansion fluid passageways 65. Thus there is continuity in fluid communication from the expansion fluid tank 72 through the flow regulator 77 into the thermal mass expansion fluid passageways 65 into the thermal battery expansion chamber 63 into the intake chamber 46 to the intake valve ports 41, which if open will have fluid communication with the cylinder expansion chamber 22 to move the piston head 23 and fluidly communicate with the exhaust chamber 45 through the exhaust valves ports 43, which if open will fluidly communicate through the exhaust tube 75 and through the check valve 76 with either atmosphere when an open cycle design is used, or with the radiator 80 and then and finally with the expansion fluid tank 72 when a closed cycle is used.

Thus when the engine starter 96 turns the drive shaft 91, and the expansion fluid pump 73 is powered through a belt 89 to pull expansion fluid 70 from expansion fluid tank 39 via expansion fluid feed tube 98 and to deliver a quantity of expansion fluid 70 through pump output tube 93 to the flow regulator 77 and into the thermal mass expansion fluid passageways 65 causing expansion fluid 70 to expand into a vapor and become expanded fluid 71; Flow regulator 77 regulates the amount of expansion fluid 70 that enters the thermal battery 60 causing excess expansion fluid 70 to return to the expansion fluid tank 39 via expansion fluid return tube 104. When the piston head 23 is at top dead center of the cylinder 21 the intake cam shaft 31 rotates such that a cam 32 opens the intake valves 42 and expanded fluid 71 vapor is passed through the intake valves ports 41 into the cylinder expansion chamber 22 to generate pressure and drive the piston head 23 from top dead center to bottom dead center, and the piston head 23 motion generates a force transmitted by the piston crank 26 to turn the crankshaft 57 and generate mechanical power using the thermodynamic potential of the expanded fluid 71 vapor; and when the piston head 23 is at bottom dead center the drive force generated on the drive shaft 91 causes the intake cam shaft 31 to rotate by 180° and a cam 32 closes the intake valves 42 and at the same time the exhaust cam shaft 33 rotates by 180° and a cam 32 opens the exhaust valves 43 to cause expanded fluid 71 vapor to exit through exhaust valves ports 41 into the exhaust chamber 45 for removal of exhaust expanded fluid 71 as the piston head 23 rises to top dead center again pushing expanded fluid 71 vapor into the exhaust tube 75 through the check valve 76 and into the radiator 80 to cool and condense the expanded fluid 71 vapor back into expansion fluid 70 and to advantageously generate a negative vapor pressure to assist and pull the piston head 23 back to top dead center to repeat the cycle. The check valve 76 prevents backflow of condensate into the exhaust chamber 45 to maintain a negative pressure and prevent condensate from entering the cylinder expansion chamber 22. The expansion fluid tank 72 receives condensed expansion fluid 70 from the radiator 80 above the level of the expansion fluid 70 therein to prevent expansion fluid 70 from flooding the radiator 80. In the closed cycle format of the invention, an expansion fluid pump 73 for pumping expansion fluid 70 from the expansion fluid tank 72 into the thermal mass expansion fluid passageways 65 to repeat the process.

The intake valves 42 and the exhaust valves 43 ride on cams 32 which force them to open and close against the compressive force of cam-springs 35 in a conventional fashion. A flywheel 90 is attached to the drive shaft 91 connected to one end of the crankshaft 57 preferably extends out of the crank case 51 through a shaft port 92 to transmit the thermal engine 10 power in the form of torque to any desired mechanical load such as the expansion fluid pump 73.

In the closed cycle format of the invention, the expansion fluid 70 can be delivered to the thermal mass expansion fluid passageways 65 by the expansion fluid pump 73. In the open cycle format of the present invention, the expansion fluid 70 can be delivered into the thermal mass expansion fluid passageways 65 by either gravitational potential or by pressurizing the expansion fluid tank 72. In the closed cycle format, no expansion fluid 70 is lost and the same quantity of expansion fluid 70 remains in the thermal engine 10's cycle in vapor and liquid phase and is reused over and over again by means of condensation and expansion. In the case of an open cycle format the expanded fluid 71 is exhausted into the atmosphere without the need for a radiator 80.

In general operation of the closed cycle engine, heat is generated and stored in the thermal mass 62 by one of two means. The first means is by passing electric current through electric resistive heating elements 94 embedded in the thermal mass 62 for a period of time and the second alternative means is by imposing an electromagnetic induction heating means 95 on the thermal mass 62 for a period of time. The thermal engine 10 is started by the engine starter 96 rotating the drive shaft 91 connected to turn a crankshaft 57. The crankshaft 57 turns the expansion fluid pump 73 which pumps a quantity of expansion fluid 70 from the expansion fluid tank 72 through a flow regulator 77 into the thermal mass expansion fluid passageways 65. The flow regulator 77 allows only the prescribed amount of expansion fluid 70 to pass into the thermal mass expansion fluid passageways 65 and the rest is returned to the expansion fluid tank 72 by a bypass tube 97. The heat stored in the thermal mass 62 causes the expansion fluid 70 to expand by a phase change into expanded fluid 71 to generate pressure in the intake chamber 46. The turning of the crankshaft 57 by the engine starter 96 causes the piston head 23 to move and when it rises to top dead center, the intake cam shaft 31 is positioned to cause a cam 32 to push the intake valves 42 to an open position while at the same time the exhaust cam shaft 33 causes a cam 32 to close the exhaust valve. The pressurized expanded fluid 71 in the intake chamber 46 rushes through intake valves 42 ports 41 into the cylinder expansion chamber 22 and pushes the piston head 23 to bottom dead center position turning the crankshaft 57 and thereby rotating the exhaust cam shaft 33 and the intake cam shaft 31 to cause the cam 32s to close the intake valves 42 and also open the exhaust valve. When the intake valves 42 closes the expanded fluid 71 in the cylinder expansion chamber 22 is exhausted by the piston head 23 as it returns to top dead center position using the momentum stored in a flywheel 90. As the piston head 23 returns to top dead center position, the expanded fluid 71 exits the cylinder expansion chamber 22 into the exhaust chamber 45 through exhaust valves port. The expanded fluid 71 is either transported through an exhaust tube 75 to the radiator 80 in the closed cycle format of the invention, or it is expelled to atmosphere in the open cycle format of the invention through the exhaust tube 75.

In the closed format of the invention, the radiator 80 cools the expanded fluid 71 vapor back into expansion fluid 70 and a check valve 76 at the end of the exhaust tube 75 generates a vacuum within the exhaust chamber 45 to increase the power of the thermal engine 10 since when the exhaust valves ports 41 opens the negative pressure in the cylinder expansion chamber 22 will, in addition to the energy stored in the flywheel 90, cause the piston head 23 to rapidly return by negative pressure to top dead center position. This adds more power to the thermal engine 10 since the invention essentially teaches the use of expansion fluid 70 in both its pressurized expanded fluid 71 vapor form, and its vacuum condensate state to push and return the piston head 23 from top dead center position to bottom dead center position and back to top dead center position. This vacuum assistance is possible in both the open cycle format and the closed cycle format if the exhausted expanded fluid 71 is passed through a long enough exhaust tube 75 before being exhausted to atmosphere. In such a case, the rapid cooling of the expanded fluid 71 in the exhaust tube 75 causes the expanded fluid 71 to undergo a phase change from the vapor phase to the liquid phase and such rapid condensation results in a vacuum being generated momentarily in the exhaust chamber 45. Thus, by adjusting the length of the exhaust tube 75, it is possible to regulate the timing of the vacuum formed with the motion of the piston head 23 as moves from top dead position center to bottom dead center position and then back to top dead center position.

At close to bottom dead center the turning of the crankshaft 57, the momentum stored in the flywheel 90, and the negative pressure of vapor condensation causes the piston head 23 to rapidly move back towards top dead center to repeat the cycle and to rotate the cam shaft to a position that causes the cam 32 to make the intake valves 42 close while causing the exhaust valves 43 to open. In a closed cycle format of the invention, the pressurized expanded fluid 71 in the cylinder expansion chamber 22 is pushed through the exhaust valves ports 41 into the exhaust chamber 45 allowing the expanded fluid 71 to exit the cylinder expansion chamber 22 and through the exhaust tube 75 and check valve 76 into the radiator 80. Alternatively the expanded fluid 71 can exit the cylinder expansion chamber 22 through the exhaust tube 75 and check valve 76 to bypass the radiator 80 and be expelled directly to atmosphere. The piston head 23 freely returns to top dead center by the continued angular momentum from the rotation of the crankshaft 57 and flywheel 90 allowing the remaining elements of the expanded fluid 71 out of the cylinder expansion chamber 22 into the exhaust chamber 45 and then to cool either in the exhaust tube 75 or in the radiator 80 to and generate a negative pressure of vapor condensation so that the cycle can continuously repeat until stopped. To stop the cycle, the flow regulator 77 is simply closed off to stop the flow of expansion fluid 70 into the thermal battery 60.

Thermal insulation 101 surrounds the thermal battery case 61 to insulate and prevent loss of heat energy. Preferably, the thermal insulation 101 is made from materials that can withstand extremely high temperatures such as polyamides and ceramics. Such materials are available as wrap around tapes from companies such as Engineered Tapes Inc., and ABS Thermal Technologies in New York. The thermal mass 62 is preferably made from any metal alloys, ceramics, silicates, clays or carbon compounds. Preferably a dense material should be used to achieve a high storage heat capacity in the thermal mass 62. The heat energy, q, stored in a material of mass m, is proportional to the temperature difference, dt, it undergoes and its specific heat capacity $c_p$ as given by the formula:

$$q = mc_p dt$$

Such dense materials that may be used for a thermal mass 62 include iron, lead, stainless steel, titanium, aluminum, molten salts, carbon composites, fiber glass composites and ceramics. The heat energy storage density is a function of the density of the material since the mass is a function of the density. Examples of the heat storage density of some materials are shown in the table below:

| Material | Heat storage density kJ/m$^2$ ° C. | Operating temperature range, ° C. |
| --- | --- | --- |
| Aluminum | 2484 | 680 |
| Cast Iron | 3889 | 1151 |
| Ceramics | 2800 | 2000 |
| Taconite | 2500 | 2000 |
| Saltstream ™ 565 | 1960 | 565 |

The expansion fluid tank 72 should be made from durable water and pressure resistant materials such as Aluminum, Stainless steel or Fiber glass including Carbon. Since the expansion fluid tank 72 can be pressurized in some instances, it must be designed to hold adequate pressure and its construction should follow adequate guidelines for manufacture of pressure tanks of the required pressure ratings.

In an embodiment of an open cycle format of the present invention, the expansion fluid tank 72 is a pressure tank made with an internal expandable rubber bladder 79 which divided the expansion fluid tank 72 into a gas chamber 78b and a fluid chamber 78a. Expansion fluid 70 is pumped into expansion fluid tank 72 under pressure through a tank intake valve 204 which is then closed off to maintain pressure. The rubber bladder 79 expands as the expansion fluid 70 fills the fluid chamber 78a and pressurizes gas held in gas chamber

78b. The stored pressure can now be used to feed expansion fluid 70 to the thermal; battery 60 in place of a expansion fluid pump 73. Advantageously, if water from a city supply line is used as the expansion fluid 70, the water will be under enough pressure to generate the pressure in the expansion fluid tank 72. A second gas charge valve 205 may be installed on either the fluid chamber 78a or the gas chamber 78b of expansion fluid tank 72 to generate additional artificial pressure if needed. Since the expansion fluid tank 72 is under pressure, condensed expansion fluid 70 from the engine cannot be easily returned to the expansion fluid tank 72 without a pump. Thus in this version of the thermal engine 10, the expanded fluid 71 from the exhaust chamber 45 is passed through a cooling coil 206 in the interior of the expansion fluid tank 72 to exchange heat with the expansion fluid 70 stored inside. This way heat energy is recovered from the expanded fluid 71 and it is also cooled to avoid hot gases from exiting the thermal engine 10. This version of the thermal engine 10 is suitable for small engines.

The engine block 20 and engine components can be constructed from metal alloys commonly used in the manufacture of standard combustion engines. However since the thermal loads that the thermal engine 10 is subjected to can be far less that regular combustion engines, it is possible to construct the engine components from aluminum alloys, ceramics, plastics and even carbon fiber materials. If water is used as an expansion fluid 70, it is even possible to manufacture the engine and its components using high temperature engineering plastics such as mentioned earlier. The design of the cylinder 21 could be augmented by inserting stainless steel sleeve cylinders to prevent the wear of the plastic due to the friction of the piston head 23 sliding on the wall of cylinder 21.

Advantageously, the use of engineering plastics could make the thermal engine 10 as light as possible to compensate for the additional weight that is needed for the thermal battery 60. Some other components of the thermal engine 10 such as the cam 32s and the cam 32 could also be made from adequate engineered plastics that can withstand mechanical loads and heat. In all the cost of manufacture of the thermal engine 10 can be reduced considerably by a suitable choice of materials.

The engine starter 96 is mechanically coupled to the drive shaft 91 by either a gear or a pulley and belt. The engine starter 96 is preferably an electric starter of conventional design that is operated by an electric battery. It could also be a rope starter similar to conventional pull rope starters used for small combustion engines. In the case when there are multiple piston head 23 s and cooperating cylinders incorporated into the thermal engine 10, the power stroke of at least one piston head 23 is opposed to the exhaust vacuum stroke of another piston head 23. In this case, the thermal engine 10 will start when expansion fluid 70 is simply delivered to the thermal battery 60 by opening the flow regulator 77 and turning on the engine starter 96. Thus the thermal engine 10 may be started by simply opening the flow regulator 77 and allowing expansion fluid 70 to push the piston head 23 in a power stroke to bottom dead center and allowing at least another piston head 23 to come to top dead center to the restart the cycle. Unlike a four stroke engine, the thermal engine 10 can be started by a simple flow regulator 77 acting as the engine starter 96. In the case of a small engine when the thermal engine 10 could simply be rotated by applying mechanical torque on the drive shaft 91, the engine starter 96 could simply be a crank that can be manually placed on the drive shaft 91 to turn the drive shaft 91 and start the thermal engine 10.

The starting of the thermal engine 10 power cycle causes the expansion fluid pump 73 to deliver a quantity of expansion fluid 70 through the flow regulator 77 into the thermal mass expansion fluid passageways 65 and the heat stored in the thermal mass 62 causes the expansion fluid 70 to become heated and to undergo a phase change and become an expanded fluid 71 vapor within the thermal mass expansion fluid passageways 65. The expanded fluid 71 is under vapor pressure and expands into the thermal battery expansion chamber 63 from where it is transmitted through intake tube 74 under pressure into the intake chamber 46. The valve cover 30 forms the two fluidly separate chambers that form the intake chamber 46 alongside the exhaust chamber 45 where it abuts the valve block 40. Every intake valves 42 ports 41 is in common fluid communication with the intake chamber 46 and so any intake valves 42 that is open will immediately transmit the pressure of the expanded fluid 71 into the cylinder expansion chamber 22 to push its corresponding piston head 23 from a position substantially at top dead center to bottom dead center, thereby rotating the crankshaft 57 and producing mechanical energy. When the piston head 23 is at bottom dead center and about to rise again to top dead center, the cam 32 causes the intake valves 42 to close and simultaneously causes the exhaust valves 43 to open and to allow the piston head 23 to freely return to top dead center and since every exhaust valves ports 41 is in common fluid communication with the exhaust chamber 45 any exhaust valves 43 that is open will immediately transmit the expanded fluid 71 from the cylinder expansion chamber 22 into the exhaust chamber 45 and allow the continued angular momentum and rotation of the crank shaft 57 and flywheel 90 so that the cycle can continuously repeat. Advantageously, the exhaust chamber 45 is fluidly connected to the input of a radiator 80 so that expanded fluid 71 may be condensed therein to generate a negative pressure in the exhaust chamber 45 to generate an additional vacuum force to pull on the piston head 23 as it returns to top dead center position. This additional vacuum force can contribute a substantial torque to the thermal engine 10 during operation. The radiator 80 output enters the expansion fluid tank 72 so that the expansion fluid tank 72 may be subjected to a buildup of a slight vacuum over time. A tank check valve 76 above the expanded fluid 71 level is placed on the expansion fluid tank 72 to prevent any vacuum loss from the expansion fluid tank 72, but allow any excess pressure from exhausted expanded fluid 71 to exit the expansion fluid tank 72. During the exhaust stroke, expanded fluid 71 in vapor form may exit the radiator 80 and fill the headspace in the expansion fluid tank 72 but any excess pressure is removed by the tank check valve 76 to prevent back pressure buildup in the exhaust chamber 45. However, since the exhaust valves 43 is closed at top dead center as soon as the exhaust stroke is completed the vacuum starts to build up again in the radiator 80 and the expansion fluid tank 72, vapor from prior power strokes has evacuated all the head space of the expansion fluid tank 72 and the vacuum build up in the expansion fluid tank 72, the radiator 80 and the exhaust chamber 45 and the vacuum thus formed will be used to assist the next exhaust cycle.

Further, a cooling fan 81 may be optionally attached to output shaft 82 to cool the radiator 80. The thermal engine 10 preferably additionally includes a thermal mass heating means including at least one resistance heating element 94 extending into the thermal mass 62 and a resistance heating element circuit 99; a power connector 100 for delivering electric current through the at least one resistance heating element 94 and thereby heating the thermal mass 62. Alternatively, the thermal mass 62 heating means includes an electromagnetic induction heating means 95 to heat the thermal mass 62 by inductive heating; said electromagnetic induction heating means 95 either may be incorporated as part of the thermal mass 62 or may be a separate unit from the thermal mass 62 so that the thermal mass 62 may be heated quickly and non-intrusively by an external electric power source using power connector 100. The thermal mass 62 optionally includes part of the engine block 20. The external electromagnetic induction heating means 95 may be an induction coil proximally placed to heat the thermal mass 62 without any contact with the thermal mass 62, so that in the event that the thermal engine 10 is installed in a vehicle 200 or mobile device, the thermal mass 62 can be heated quickly by just passing through the vehicle 200 or mobile device through the electromagnetic field of such the electromagnetic induction heating means 95 without contact.

To take advantage of as large a thermal mass 62 as possible the thermal mass 62 may additionally include the material the engine made from so that if insulated, the thermal loss can be minimal. It is important that the intake chamber 46 be insulated as much as possible so that the expanded fluid 71 vapor retains as much heat as possible before it is introduced into the cylinder expansion chamber 22. It is important that the exhaust chamber 45 not be insulated so that as much heat can be taken out of the expanded fluid 71 vapor to reduce it to expansion fluid 70 liquid after it has done its work.

The thermal engine 10 preferably operates on a noncombustible expansion fluid 70 such as water or a refrigerant fluid; it is important that the expansion fluid 70 have as high a heat of vaporization as possible. Water and refrigerants such as ammonia have the highest heat of vaporization per kilogram. Some examples of heat of vaporization are given below:

| Compound | Heat of vaporization (kJ mol$^{-1}$) | Heat of vaporization (kJ kg$^{-1}$) |
| --- | --- | --- |
| Methane | 8.19 | 760 |
| Ethanol | 38.6 | 841 |
| Methanol | 35.3 | 1104 |
| Ammonia | 23.35 | 1371 |
| Water | 40.65 | 2257 |

The thermal engine 10 additionally includes an expansion fluid tank 72 in fluid communication with thermal mass expansion fluid passageways 65. A expansion fluid pump 73 supplies expansion fluid 70 from the expansion fluid tank 72 to the thermal mass expansion fluid passageways 65 so that when the expansion fluid 70 enters the thermal mass expansion fluid passageways 65 it expands quickly and pressurizes the thermal battery expansion chamber 63 with uniform vapor pressure. This way the vapor pressure is constantly transmitted from the thermal battery expansion chamber 63 to intake valves 42 to feed all the cylinders 21 as needed. Thus as each intake valves 42 opens, the pressure is readily available to power the piston head 23 and run the thermal engine 10. Thus unlike conventional engines, the intake chamber 46 is always under pressure and all the intake valves 42 are subjected to this pressure so that when each opens it is fed pressurized expanded fluid 71 from the intake chamber 46. In this way, there is very little fluid regulation needed to ensure adequate operation of the thermal engine 10.

In accordance with the present invention, a thermally charged thermal battery 60 is used to generate mechanical energy by a phase change of an expansion fluid 71 such as water. The thermal energy causes the expansion fluid 70 to expand into an expanded fluid 71 vapor by a phase change and thus permits the thermal engine 10 to run like a conventional engine without much change to the engine configuration.

An object of the prevent invention is to provide a thermal engine 10 which can be operated with an expansion fluid 70 having the most suitable thermodynamic properties to achieve a high degree of efficiency during operation. An engine of this kind, in accordance with the invention, can be optimized by its geometry through maximizing the thermal mass 62 and minimizing the surface area of the thermal battery 60 for storing a maximum amount of thermal energy in the form of a direct heat.

Essentially, a heat storing thermal battery 60 is incorporated into the engine which permits energy to be stored thermally instead of chemically as in the case of a conventional electric battery. Advantageously, the entire engine block 20 can be used as a thermal source in the form of a thermal mass 62, so that a large amount of thermal energy can be stored for later use. The thermal battery 60 can be charged with heat to a high temperature using electric heaters, electromagnetic induction heating means 95 or other forms of heat generators incorporated into of the thermal battery 60. For example a solar powered heat generator such as a lens can be used to focus heat on the thermal battery 60 during charging to reduce the cost of using conventional electric energy sources. In the case when a fluid can undergo a phase change with very little heat, it is possible to use very low temperature thermal heating means to store energy in a thermal battery 60. It is possible that with the advances in nuclear technology that a miniscule and well protected thermonuclear heating means could be incorporated into a well-protected radiation shielded thermal battery 60. In fact since the thermal mass 62 is substantial, it could be made from radiation shielding materials such as lead alloys to prevent any radiation leakage during the heat generation using thermonuclear reactions. Radioactive heating means may provide an in exhaustible supply of thermal energy for the thermal engine 10.

In case of emergencies, it is possible to use a chemically based heating fuel to generate heat that can be stored in the thermal battery 60. Further, the expansion fluid need not be clean water and it could be taken from any waste source in case of emergencies.

Moreover, the exhaust from the thermally expanded fluid 71 from the thermal engine 10 can be cooled to generate a reverse condensation liquid phase vacuum that could assist in the return cycle by pulling on the piston head 23 when it is at top bottom center. In such a case, the maximum potential of the expansion fluid 70 during condensation and creating a vacuum could be used in conjunction with its expansive energy. An expansion fluid 70 such as water can be injected into the thermal mass 62 of the thermal engine 10 to generate steam and power the thermal engine 10. Optionally, a combination of water and ethanol and other fluids may be used as an expansion fluid 70. Advantageously, much more energy can be stored in such a thermal battery 60 than in a conventional electric battery of the same weight. This can be demonstrated by simply exhausting the electrical energy of an electric battery of a given mass to heat up a thermal mass 62 of the same mass. The thermal storage capacity of some materials and two types of electric batteries is shown in the table below:

Volumetric heat capacity for materials that can be used by a thermal battery.

| Material | Volumetric heat capacity (Joules/cm³/K) | Maximum operating temperature °C. | Minimum Thermal Energy in Joules stored in 28000 cm³ (1 cubic foot) of material raised from 60° C. |
|---|---|---|---|
| Aluminum | 2.42 | 660 | 41,116,061.00 |
| Beryllium | 3.368 | 1287 | 122,742,656.30 |
| Copper | 3.45 | 1084 | 105,899,342.90 |
| Graphite | 1.53 | 3697 | 160,171,694.20 |
| Iron | 3.53 | 1536 | 153,536,207.60 |
| Lead | 1.44 | 327 | 13,333,836.72 |
| Lithium ion battery. | 2.3 MJ/1000 cc | | 64,400,000.00 |
| Nickel-metal hydride battery | 0.288 MJ/1000 cc | | 8,064,000.00 |

From the table it is clear that the heat storage capacities per unit volume of graphite, iron, beryllium and copper are far larger than a corresponding electric battery.

It is important note that there exist other types of electrical thermal batteries which use liquid lithium and other salts as electrolytes. These existing electrical batteries are only suitable for storing electrical energy. The present invention is a true thermal battery 60 which can be used to supply heat and electrical energy stored in the form of heat and electrolyte simultaneously. Advantageously, the present thermal battery 60 can be used in conjunction with a molten electrolyte contained within the battery as a thermal mass 62 to store both heat potential energy and electric potential energy simultaneously. Without limiting the scope of the invention, however, the preferred mode of operation is in a pure thermal mode wherein the thermal battery 60 is simply a thermal mass 62.

Figure 17:
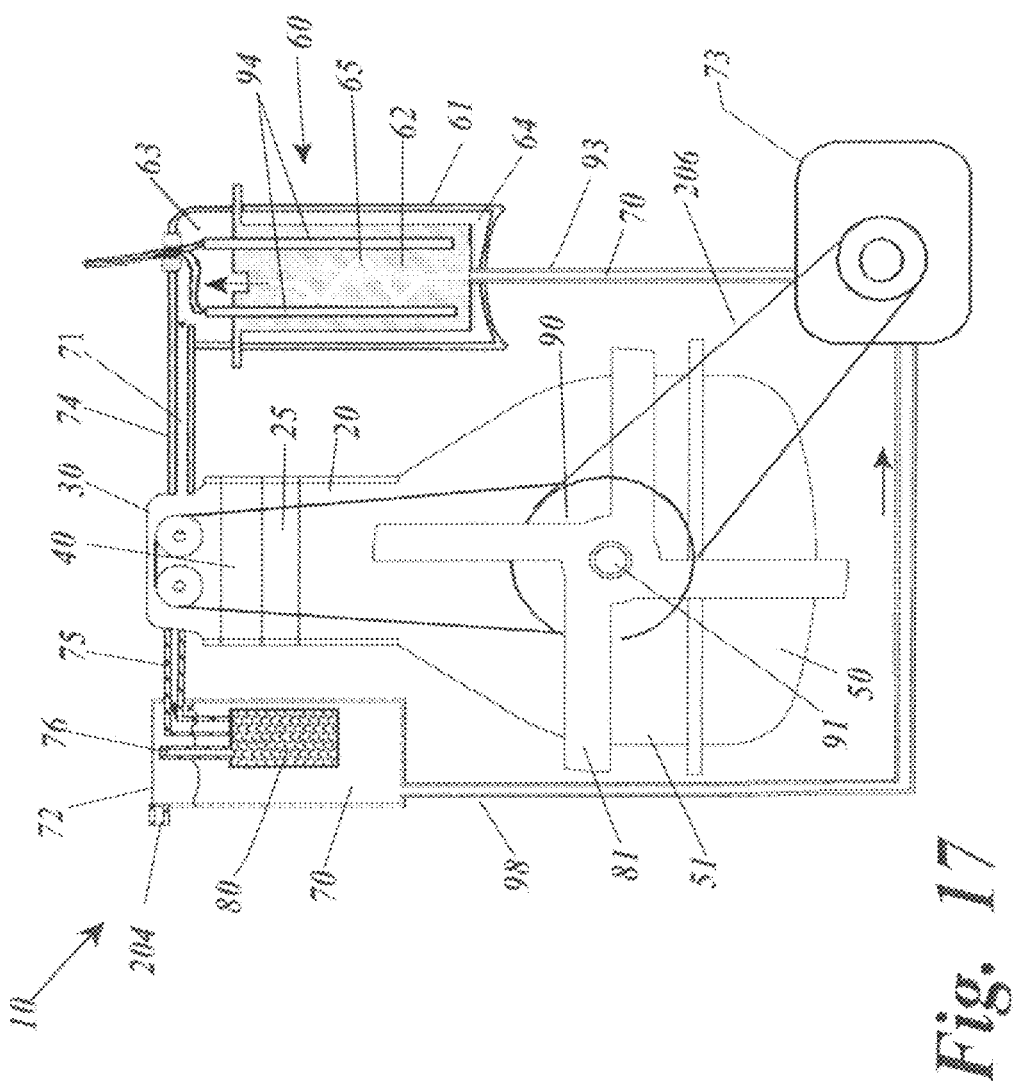
FIG. 17 shows a thermal engine with a radiator exchanging heat from expanded directly with expansion fluid during its operation.
Figure 18:
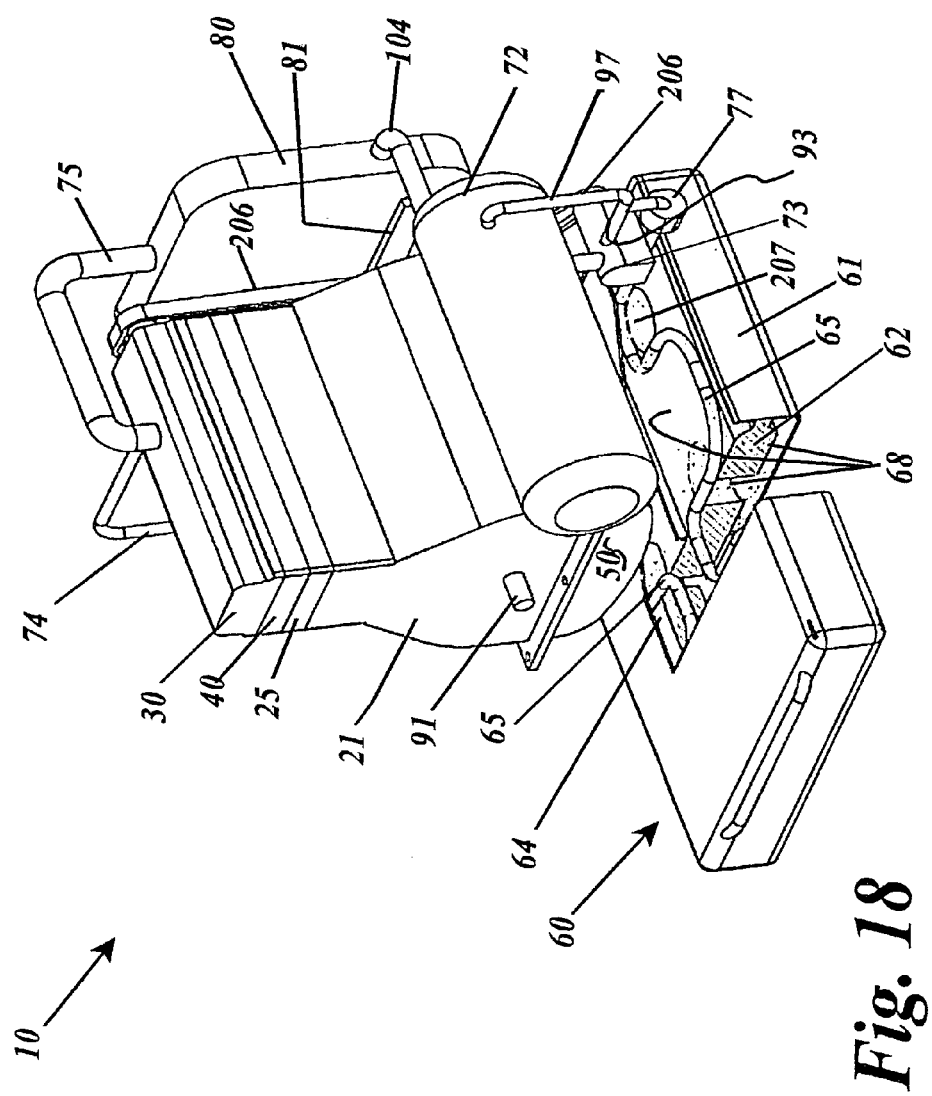
FIG. 18 shows a thermal engine with a pressurized expansion fluid tank with a bladder. The bladder causes the expansion fluid to be stored under pressure so that the expansion fluid can be fed to the thermal battery without the need for a pump.
Figure 19:
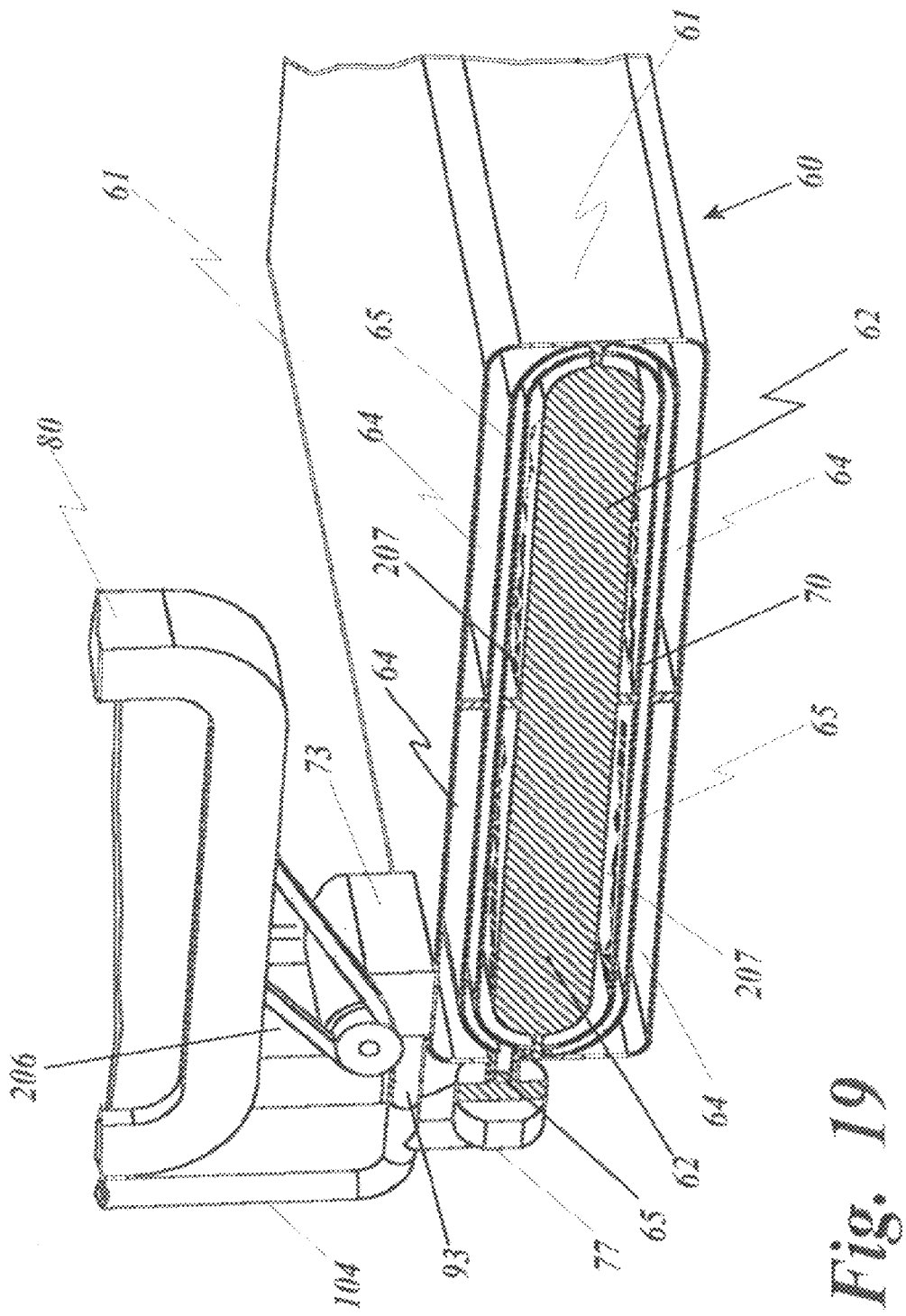
FIG. 19 is a perspective, cross-sectional view of the thermal battery connected to the radiator, revealing the thermal mass inside the thermal battery.

Preferably, the thermal mass 62 can be made from graphite which is light and can store a lot of heat. Since graphite is brittle, it is important that the thermal mass expansion fluid passageways 65 not be directly on the graphite material itself. For this purpose, one would be able to radioactively heat a metal tube that will serve as the thermal mass expansion fluid passageways 65. The thermal mass expansion fluid passageways 65 could then be incorporated within the thermal battery vacuum chamber 64 as a metal tube surrounding but not touching the thermal mass 62. This also allows any radiation heat loss from the thermal mass 62 to be absorbed directly by the thermal mass expansion fluid passageways 65. A graphite core thermal battery 60 is shown in FIG. 17.

Further, since the engine components operate at the phase change temperatures, if water is used as expansion fluid 70, the entire thermal engine 10 could be built from a suitable plastic with a thermal mass 62 made from graphite and a thermal battery case 61 made from ceramics. This saves weight and makes it possible to mount the graphite core thermal battery directly beneath the chassis of a vehicle 200 so that the thermal battery 60 can be charged with an electromagnetic induction heating means 95 that is beneath the road. Then a vehicle can easily pass over the electromagnetic induction heating means 95 without stopping. In fact if the electromagnetic induction heating means 95 are placed at prescribed distance intervals on a long stretch of road 201, the vehicle 200 using a thermal engine of this sort can travel long distances without the need for stopping for a recharge. A sensor 202 could be incorporated to sense the vehicle 200 as it approaches an electromagnetic induction heating means 95, to active the charging automatically.

A liquid such as water can be used as an expansion fluid 70, and part of the thermal mass 62 can be projected into the cylinder 21 to create an additional thermal storage source for generating efficient vapor phase change. If the entire engine block 20 is used as a thermal mass 62, additional thermal energy can be stored by proper design and insulation of the entire thermal engine 10. Additionally, the expansion fluid 70 can store thermal energy by heating it to a temperature just below its phase change point. By pressuring the expansion fluid tank 70 the boiling temperature of the expansion fluid 70 could be substantially increased so that it can be heated to a temperature higher than its regular boiling point before it is exposed to the thermal mass 62. The expansion fluid 70 in the expansion fluid tank 72 may be heated by tank electric heaters 101, so that during charging, the expansion fluid 70 may also be pre-charged with thermal energy to near its boiling point to increase its thermal potential.

The supply of the expansion fluid 70 quantities can be controlled by means of electronics controlling the expansion fluid pump 73 so that an exact metering of the expansion fluid 70 can be achieved which has at least a level of control for the different thermodynamic properties of different types of expansion fluid 70.

The thermal battery case 61 is preferably made from materials that have a high thermal resistance and melt temperature. Ceramics could be used to ensure that the thermal mass 62 can be taken to the highest possible temperatures without melting the thermal battery case 61. In one preferred embodiment, the thermal battery case 61 is made from high temperature ceramics and glass for a good vacuum and heat insulation. The ceramic Rescor 960 Alumina™ manufactured by Cotronics Corp, in Brooklyn N.Y., is a very high temperature moldable and machinable material that can withstand up to 1684° C., (3000° F.). Since ceramics tend to be porous, the thermal casing boundary could be made from a glassy material such as silicate glass and then reinforced with the ceramic inner wall. The thermal mass 62 could also then be fashioned with similar materials to hold a large thermal load. The thermal mass 62 can also be made from high temperature graphite lined with a glass skin for the thermal mass expansion passageways 65 embedded in the thermal mass 62. Graphite can be quickly and efficiently heated by both electric resistance means and by induction heating means.

The thermal battery 60 could be either separate or incorporated into the design of the engine block 20. In the case when it is incorporated directly into the engine block 20 the thermal battery case 61 could be incorporated as part of the design of the engine block 20 with the thermal battery expansion chamber 63 directly incorporated as part of the engine block 20.

The thermal battery vacuum chamber 64 must be designed to maximally surround the thermal mass 62 so that no heat can be transmitted by conduction or convection from the thermal mass 62 to the thermal battery case 61 by conduction or convection. Where possible, the conductive portions where the thermal mass 62 contacts the thermal battery case 61 should be minimized so that the thermal mass 62 is essentially suspended inside the thermal battery vacuum chamber 64 by minimally conductive members. A vacuum resistant material should be used to construct the thermal battery case 61 to prevent the loss of vacuum, thus preferably the thermal battery case 61 could be made from glass, graphite, ceramics and metal alloys of suitable properties. The outer thermal insulation 101 of the thermal battery case 61 should be designed for minimal radiation. Preferably, the interior wall of the thermal battery vacuum chamber 64 should be reflective to heat so that radiation is stored inside of it by reflection with minimal losses. The thermal battery case 61 could be made from thermally insulating materials so that as much heat is stored within the thermal battery 60 as possible. The thermal battery vacuum chamber 64 should be evacuated to a high degree to avoid heat loss during operation. All fluid delivery passages and tubes should be insulated to a very high degree to prevent heat loss and their lengths should be minimized as much as possible.

Since there is no need to compress a fluid for firing and combustion, the thermal engine 10 should be designed as two stroke engines even though four-stroke designs are quite possible when the power strokes are distributed properly. The two strokes use a single stroke for a power stroke and a single return stroke for an exhaust stroke. In the preferred embodiment, pressurized expanded fluid 71 enters the intake chamber 46 and serves all the cylinder expansion chambers 22 simultaneously. This reduces the complexity of the expanded fluid 71 control-system since the expanded fluid 71 inside the intake chamber 46 is always pressurized during operation and ready to feed pressurized expanded fluid 71 into each cylinder expansion chamber 22 when its intake valves 42 opens. Each intake valves 42 opens when its piston head 23 is at its top dead center and again closes when its piston head 23 is at bottom dead center. Each exhaust valves 43 opens when its piston head 23 is at its bottom dead center and again closes when its piston head 23 is at top dead center. The exact position when the valves open could be adjusted to compensate for lag in the delivery rate of the expanded fluid 71 and the exhausted rate of the expanded fluid 71. In some cases, it is possible to isolate each cylinder 21 to have its own intake chamber 46 and its own exhaust chamber 45. In this case, it is possible to rearrange the power strokes of each piston head 23 so that they can be sequenced as necessary to maximize the power outtake of the thermal engine 10.

A flywheel 90 is essential to keep the cycle going since very little power is generated during the motion of the piston head 23 from bottom dead center to top dead center even though if a vacuum is maintained in the exhaust chamber 45 a substantial force could be generated to assist the return of the piston head 23. In the case when a closed cycle thermal engine 10 is built, the exhausted expanded fluid 71 vapor should be cooled in a non-resistive radiator 80. The passageways for the expanded fluid 71 vapor in the radiator 80 should be free from any back pressure and the radiator 80 should be able to quickly remove all the heat of condensation from the expanded fluid 71 so that it can quickly condense to expansion fluid 70 and thus recycled as quickly as possible before losing most of its heat. In fact the equilibrium heat intake and removal rate of the radiator 80 should be equal to the rate of heat of condensation of the expanded fluid 71 so that the liquid phase of the expansion fluid 70 remains as close to its boiling point as possible. This ensures that very little heat is taken from the thermal battery 60 by the expansion fluid 70 to re-expand it to a vapor phase. The expansion fluid tank 72 could be incorporated as part of the exhaust tube 75 of the radiator 80. This way the expansion fluid 70 is stored in the exhaust tube 75 as opposed to using a separate expansion fluid tank 72 for the same purpose. The condensate expansion fluid 70 from the radiator 80 can be held in a segment of exhaust tube 75 which will act as an expansion fluid tank 72 to minimize the size and complexity of the thermal engine 10, and more importantly to minimize the exposure of the condensed expansion fluid 70 to the atmosphere. The expansion fluid 70 from the expansion fluid tank 72 can then be transferred directly by the expansion fluid pump 73 to the thermal mass expansion fluid passageways 65 for reuse in subsequent cycles as needed. If the radiator 80 is large enough, the condensate could be taken directly from the radiator 80 output and reused as the expansion fluid 70 so that it can also act directly as the expansion fluid tank 72.

In the case when an open cycle thermal engine 10 is built the exhausted expanded fluid 71 vapor could be exhausted directly to the atmosphere and not reused. The most suitable expansion fluid 70 for this purpose is water since it is environmentally friendly. In the open cycle format of the invention, the thermal engine 10 is provided with an expansion fluid tank 72 that can store an adequate amount of expansion fluid 70 for the required period of use of the thermal engine 10. Then, the exhausted expanded fluid 71 could be passed through a radiator 80 or simply expelled to atmosphere as vapor. The radiator 80 could be a simple coiled exhaust tube 75 that could be incorporated with a check valve 76 at its end that only allows fluid to pass to atmospheric pressure so that as the expanded fluid 71 is exhausted it cools inside the exhaust tube 75 and condenses to a liquid phase to form a vacuum in the exhaust tube 75 and the exhaust chamber 45 and the check valve 76 closes to maintain the vacuum. The vacuum subjects the exhaust valves 43 to a negative pressure that can be used to assist the piston head 23 to rise to top dead center when the said exhaust valve 43 is opened. When the vacuum subsides during the power cycle, the check valve 76 relaxes and opens and water is expelled into the atmosphere. This way, only liquid water is exhausted as a wasted fluid from the engine. No radiator 80 may be needed if there is an adequate supply of expansion fluid 70, but the returning expansion fluid 70 is hot and its reuse of can assist in reducing the energy drawn from the thermal battery 60. In such a case, the condensed expansion fluid 70 can be recaptured in the expansion fluid tank 72 under atmospheric conditions. In the open cycle embodiment of the present invention, the expansion fluid tank 72 should be in fluid communication with the atmosphere so that no back pressure is generated by the exhausting expanded fluid 71, and if the radiator 80 becomes too hot, the expanded fluid 71 vapor can simply escape from expansion fluid tank 72 to atmosphere without generating a back pressure on the intake chamber 46. In yet another embodiment of the open cycle, the radiator 80 could be submerged inside the expansion fluid 70 in the expansion fluid tank 72 to exchange heat directly with the expansion fluid 70 stored therein. This allows a lot of the exhaust heat to be captured. However if this is done it is important that the output of the radiator 80 exhaust be above the liquid level so that in the case of a vacuum being generated by the condensate, the expansion fluid 70 will not be sucked backwards into the exhaust chamber 45.

In yet another embodiment of the present invention, the thermal battery case 61 is made from a ceramic composite of suitable choice and the thermal mass 62 is made from graphite and the thermal mass expansion fluid passageway 65 is a tube made from beryllium which has a melting point of 1287° C. A suitable metal alloy can be used as a heat exchanger between the thermal mass itself and the thermal mass expansion fluid passageway 65. If the thermal mass 62 is heated to 2500° C., the radiation heat temperature at a minimum distance of about 5 cm will be in the order of 1000° C. Thus the thermal mass expansion fluid passageway 65 can be made from a tube of beryllium which has very good conductivity of heat (216 W·m$^{-1}$·K$^{-1}$) as well as a very low expansion coefficient (11.4×10$^{-6}$ K$^{-1}$). If the thermal mass expansion fluid passageway 65 is made from a beryllium tube that distally surrounds the thermal mass 62 without physical contact, then it can be configured to line and protect the thermal battery casing 61. A suitable metal such as aluminum which melts at 660° C. is then placed inside the thermal battery vacuum chamber 64 to act as a phase change heat exchange medium 68 between the thermal mass 62 and the thermal mass expansion fluid passageway 65. When the thermal mass 62 is heated, it radiates and causes the phase change heat exchange medium 68 phase change heat exchange medium 68 to vaporize and become a vapor. The vapor from the metal is deposited on the thermal mass expansion fluid passageway 65's surface to deposit heat of condensation and then heat the thermal expansion fluid 70. The cooled vapor liquefies and condenses around the thermal mass expansion fluid passageway 65 and then drops by gravity back in the thermal battery vacuum chamber 64 to repeat the process. This provides an efficient way of transferring heat from the graphite core thermal mass 62 to the thermal mass expansion fluid passageway 65 and eventually to the expansion fluid 70. The phase change heat exchange medium 68 can also act as a reflective coating on the inside of the thermal battery vacuum chamber 64 to prevent radiation heat loss from its surface.

While the invention can be used only with a noncombustible phase change liquid such as water, it may also be used in combination with or separately with a potentially combustible expansion fluid 70 that have a high volumetric expansion values.

While the invention can be used only with a noncombustible phase change liquid such as water it may also be used in combination with or separately with a potentially combustible expansion fluid that have a high expansion value.

Method

In practicing the invention, the following method may be used. One embodiment of the present thermal engine 10 operates for example according to the following steps, as illustrated in the figures: fueling the thermal engine 10 with water; heating the thermal battery 60 to the highest possible temperature; starting the thermal engine 10 with an electric engine starter 96; injecting expansion fluid 70 into thermal mass expansion fluid expansion fluid 64; generating steam to pressurize the cylinder 21; repeating the process for additional pistons 24 in a continuous cycle; driving the piston head 23 at top dead center with expanded fluid 71 (steam) generated from thermal battery 60; exhausting steam from first cylinder expansion chamber 22 at bottom dead center; the crankshaft 57 lifting next piston 24 to top dead center; and steam pushing piston 24 to bottom dead center and turning the crankshaft 57; and repeating the cycle until a stop is required.

In the case when the engine is constructed only to use a phase change liquid such as water as an expansion fluid no air intake is necessary as in a conventional engine that burns fuel. In the case when the engine can be used to generate both electric and mechanical energy, the thermal mass 62 includes a molten electrolyte and a metal. The electrolyte can be a salt, such as Lithium. In such a case, the lithium may be molten as an alloy with a silicate or aluminum, or pure aluminum metal held in a matrix of another metal such as iron. Molten salts with high melting points are used as the electrolyte, while at the same time the matrix of molten salts act as a thermal source for thermal energy to generate the vaporization energy needed to expand the expansion fluid 70.

In most conventional electric thermal batteries, the negative electrode is molten sodium salts, while the positive electrode is a nickel or chromium salt in the charged state. Advantageously, the thermal battery 60 of the present invention is used to generate both electricity and thermal energy, so that it can be used to power a thermal engine 10 in both expansion fluid and electric motor modes. The electric mode could be used to operate engine starter The use of nickel and nickel chloride is suitable and well established for this purpose, and thus, the advantages of keeping these salts in a molten state establishes the present electric thermal battery as an improvement over prior electric thermal batteries, and the present electric thermal battery additionally uses its greater stored heat to enhance expansion of an expansion fluid in an engine cylinder to increase engine power and efficiency. Since nickel and nickel chloride are almost insoluble in acid neutral and basic salts, intimate contact of the molten salts can occur without much loss of efficiency. Since both NaAlCl$_4$ and Na are liquid at the engine operating temperature, a sodium-conducting-alumina ceramic is used to separate the liquid sodium from the molten NaAlCl$_4$. This type of electric battery was invented in 1985 by a group led by Dr. Johan Coetzer at the CSIR in Pretoria, South Africa. The current invention uses a thermal battery which may or may not utilize this invention as an improvement. Also, the present thermal battery operates at much higher temperatures, in a range of 400 degrees F. to 3000 degrees F. to operate, while conventional electric thermal batteries generally only need temperatures of 400 degrees F. to 500 degrees F. The higher temperature requirement of the present battery causes the battery to store enough heat to provide additional mechanical power by evaporation of a liquid expansion fluid.

Advantageously, the present thermal battery consists of a highly insulated storage vacuum chamber for heated salts or metals an electrolyte for preventing a loss of heat to the environment. These heated salts and metals also may be in a molten state, so that they can be incorporated as electrolytes to additionally act as a conventional electric thermal battery. Thus the present invention functions primarily as a thermal energy source but additionally functions as an electrical energy source for powering engines. During the heat charging of the present electric thermal battery, electric energy is directed into the insulated electrolyte chamber by electrodes, so that the metals and other elements within the thermal battery can be heated to very high temperatures. The metals and salts that act as heat storage medium can also be in a molten state. Then the present electric thermal battery preferably can simultaneously serve to store thermal and electrical energy for later use when needed to power the engine by mechanical and electrical means respectively. The incorporation of molten salts and metals into the present electric thermal battery only serves to act as a thermal storage system for evaporation of a liquid to a vapor while preferably providing a means to generate high electric currents to power auxiliary electric motors if needed. This combination of electric and thermal energy allows an electric starter 96 to be incorporated without the need for a conventional battery and for the engine to also provide electrical energy when needed. The combination of these two uses in the present invention is unique and an improvement over the prior art.

Thus the thermal battery 60 serves to power an engine by a thermal transfer of energy, and in recognition of the fact that molten salts can be used instead of ordinary thermal substances, the present thermal battery 10 also serves as an electric power pack without compromising the advantages and enhanced function of the present invention.

Suffice to say that one skilled in the art would appreciate that the temperatures needed to store enough thermal energy to thermally power an engine by phase change of any expansion fluid to a vapor must be very high indeed and far exceed the maximum requirements of conventional electric thermal batteries as shown in table 2 above. This high temperature can be achieved by storing a molten metal in a ceramic or cast iron electrolyte chamber. Such an electrolyte chamber preferably is insulated by a ceramic-foam, such as Rescor™ 902 Alumina Silicate or Duocel® Silicon Carbide Foam. There exist several such insulating foams suitable for this purpose. The entire engine block preferably serves as a thermal battery when properly insulated. In all cases, only high temperature bearings and fittings should be used in the design of the present engine.

Last but not in the least the lesser important of all these embodiments, diesel fuel may be used when needed to run the thermal engine 10. Since the thermal mass 62 is at a very high temperature that will cause any conventional fuel to explode, any conventional fuel may be used or added to water to enhance the explosive force caused by the expansion fluids to achieve the aims and desired of the present invention in all its embodiments.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A thermal engine, comprising:
an expansion fluid tank;
a thermal battery in fluid communication with said expansion fluid tank;
engine block means;
a cylinder mounted to and closed at one end by said engine block means;
a piston having a piston head and a piston rod, said piston head being slidably and sealingly retained within said cylinder to form a variable volume cylinder expansion chamber between said piston head and said engine block means, said piston rod being connected to a piston crank;
an engine valve block means sealingly mounted to said engine block means;
an engine valve block means cover sealingly mated to said engine valve block defining an intake chamber sealingly mated to an oil sump, said engine valve block means having intake valve means with an intake valve and having an exhaust valve means with an exhaust valve;
said intake valve means fluidly being connected to said intake chamber and receiving expanded fluid from said thermal battery, and said exhaust valve means fluidly connected to said exhaust chamber for removal of exhausted expanded fluid;
a crankshaft mechanically linked to said piston head opposite said engine valve block means by the piston rod;
a valve operating means comprising a cam shaft and cams mounted thereon, said cam shaft driven by the torque of a drive shaft;
engine starting means connected to said drive shaft;
the thermal battery consisting of a contiguous thermal battery case divided into first and second separate fluid chambers by a thermal mass for storing heat energy, said first chamber comprising a thermal battery expansion chamber in fluid communication with said intake chamber and said expansion fluid tank;
an expansion fluid pump for delivering expansion fluid from said expansion fluid tank into said thermal battery, and comprising of a hermetically sealed thermal battery vacuum chamber surrounding at least part of said thermal mass, said thermal battery expansion chamber comprising at least one thermal mass expansion fluid passageway within said thermal mass for accepting expansion fluid from said expansion fluid tank to uniformly heat and expand the expansion fluid from the liquid phase to an expanded fluid in the vapor phase within said thermal mass, said thermal mass expansion fluid passageways to accumulate pressurized expanded fluid vapor into the thermal battery expansion chamber for delivery into said intake chamber;
such that when said engine starting means turns said drive shaft, said expansion fluid pump delivers a quantity of expansion fluid from the fluid tank into said thermal mass expansion fluid passageways causing expansion fluid to expand into a vapor and become expanded fluid, and when the piston head is at top dead center of the cylinder chamber the cam opens the intake valve means and expanded fluid vapor is passed through the intake valve means into said cylinder expansion chamber to generate pressure and drive the piston head from top dead center to bottom dead center, the piston head motion generating a force transmitted by said piston crank to turn said crankshaft and generate mechanical power using the thermodynamic potential of the expanded fluid vapor, and such that when said piston head is at bottom dead center the drive force generated on said drive shaft causes the cam to close said intake valve means and the cam to open the exhaust valve means and cause expanded fluid vapor to exit through said exhaust valve means into said exhaust chamber for removal of exhaust expanded fluid as such piston head rises to top dead center passing expanded fluid vapor into a radiator to cool and condense the expanded fluid vapor back into expansion fluid and to advantageously generate a negative vapor pressure to assist and pull the piston head back to top dead center to repeat the cycle;
the expansion fluid tank receiving condensed expansion fluid from the radiator, and the expansion fluid pump pumping expansion fluid from the expansion fluid tank back into the thermal mass expansion fluid passageways to repeat the process.

2. A thermal engine, comprising:
an expansion fluid tank;
a thermal battery containing expansion fluid and in fluid communication with said expansion fluid tank;
a cylinder closed at one end by a cylinder end closure structure;
a piston having a piston head and a piston rod mechanically linked to said piston head, said piston head being slidably and sealingly retained within said cylinder to form a variable volume cylinder expansion chamber between said piston head and said cylinder end closure structure;

a crankshaft mechanically linked to said piston head opposite by said piston rod;

intake valve means with an intake valve and having an exhaust valve means with an exhaust valve;

said intake valve means being fluidly connected to said intake chamber and receiving expanded expansion fluid from said thermal battery, and said exhaust valve means being fluidly connected to said cylinder expansion chamber for removal of exhausted expanded expansion fluid;

a radiator in fluid communication with said variable volume cylinder expansion chamber;

a valve operating means;

engine starting means connected to said crankshaft to rotate said crankshaft and start the engine;

an expansion fluid pump means for delivering expansion fluid from said expansion fluid tank into said thermal battery;

such that when said engine starting means turns said drive shaft, said expansion fluid pump delivers a quantity of expansion fluid from an expansion fluid tank into said thermal battery and said thermal battery delivers heat into the liquid expansion fluid causing the expansion fluid to expand into an expansion fluid vapor, and when said piston head is at subsequently top dead center of the cylinder chamber said valve operating means opens the intake valve means and the expansion fluid vapor is passed through the intake valve means into said cylinder expansion chamber to generate pressure and drive said piston head from substantially top dead center, to substantially bottom dead center, pressure of the expansion fluid against said piston head generating a force to turn said crankshaft and generate mechanical power using the thermodynamic potential of the expansion fluid vapor;

and such that when said piston head is at substantially bottom dead center, said valve operating means closes said intake valve means and opens said exhaust valve means and thereby permits the expansion fluid vapor to exit through said exhaust valve means for removal of exhaust expansion fluid vapor as said piston head rises to top dead center, passing expansion fluid vapor into said radiator to cool and condense the expansion fluid vapor back into expansion liquid for delivery back into said expansion fluid tank.

3. The thermal engine of claim 2, wherein said cylinder end closure structure comprising engine block means.

4. The thermal engine of claim 3, additionally comprising an engine valve block means sealingly mounted to said engine block means and containing said intake valve and said exhaust valve.

5. The thermal engine of claim 4, additionally comprising an engine valve block means cover sealingly mated to said engine valve block means defining an intake chamber.

6. The thermal engine of claim 2, wherein said valve operating means comprises a cam shaft and cams mounted thereon, said cam shaft being drivably connected to said crankshaft.

7. The thermal engine of claim 5, wherein said thermal battery comprises a thermal mass and a contiguous thermal battery case divided into first and second separate fluid chambers by said thermal mass for storing heat energy, said first chamber comprising a thermal battery expansion chamber in fluid communication with said intake chamber and with said expansion fluid tank.

8. The thermal engine of claim 7, wherein said expansion fluid pump means comprises a hermetically sealed thermal battery vacuum chamber surrounding at least part of said thermal mass, said thermal battery expansion chamber comprising at least one thermal mass expansion fluid passageway within said thermal mass for accepting expansion fluid from said expansion fluid tank to uniformly heat and expand the expansion fluid from the liquid phase to an expanded fluid in vapor phase within said thermal mass, said at least one thermal mass expansion fluid passageway accumulating pressurized expanded fluid vapor into the thermal battery expansion chamber for delivery into said intake chamber.

9. A thermal engine system, comprising:

a thermal engine comprising an expansion fluid source; a thermal battery containing expansion fluid and in fluid communication with said expansion fluid source; a cylinder closed at one end by a cylinder end closure structure; a piston having a piston head and a piston rod mechanically linked to said piston head, said piston head being slidably and sealingly retained within said cylinder to form a variable volume cylinder expansion chamber between said piston head and said cylinder end closure structure; a crankshaft mechanically linked to said piston head opposite by said piston rod; intake valve means with an intake valve and having an exhaust valve means with an exhaust valve; said intake valve means being fluidly connected to said intake chamber and receiving expanded expansion fluid from said thermal battery, and said exhaust valve means being fluidly connected to said cylinder expansion chamber for removal of exhausted expanded expansion fluid; a valve operating means; engine starting means connected to said crankshaft to rotate said crankshaft and start the engine; an expansion fluid pump means for delivering expansion fluid from said expansion fluid source into said thermal battery;

such that when said engine starting means turns said drive shaft, said expansion fluid pump delivers a quantity of expansion fluid from an expansion fluid source into said thermal battery and the said thermal battery delivers heat into the liquid expansion fluid causing the expansion fluid to expand into an expansion fluid vapor, and when said piston head is at subsequently top dead center of said cylinder chamber said valve operating means opens said intake valve means and the expansion fluid vapor is passed through said intake valve means into said cylinder expansion chamber to generate pressure and drive said piston head from substantially top dead center, to substantially bottom dead center, pressure of the expansion fluid against said piston head generating a force to turn said crankshaft and generate mechanical power using the thermodynamic potential of the expansion fluid vapor;

and such that when said piston head is at substantially bottom dead center, said valve operating means closes said intake valve means and opens said exhaust valve means and thereby permits the expansion fluid vapor to exit through said exhaust valve means for removal of exhaust expansion fluid vapor as said piston head rises to top dead center, passing expansion fluid vapor out of said cylinder;

and an induction charger for positioning adjacent to said thermal battery to charge said thermal battery.

10. The thermal engine system of claim 9, additionally comprising a vehicle to which said thermal engine is attached, such that said vehicle periodically moves adjacent to said induction charger to charge said thermal battery, wherein said expansion fluid source comprises an expansion fluid tank mounted on said vehicle.

11. The thermal engine system of claim 9, additionally comprising an expansion fluid tank.

12. The thermal engine system of claim 9, wherein said cylinder end closure structure comprises engine block means.

13. The thermal engine system of claim 12, additionally comprising an engine valve block means sealingly mounted to said engine block means and containing said intake valve and said exhaust valve.

14. The thermal engine system of claim 13, additionally comprising an engine valve block means cover sealingly mated to said engine valve block means defining an intake chamber.

15. The thermal engine system of claim 13, additionally comprising an oil sump mated to said intake chamber.

16. The thermal engine system of claim 9, wherein said valve operating means comprises a cam shaft and cams mounted thereon, said cam shaft being drivably connected to said crankshaft.

17. The thermal engine system of claim 15, wherein said thermal battery comprises a thermal mass and a contiguous thermal battery case divided into first and second separate fluid chambers by said thermal mass for storing heat energy, said first chamber comprising a thermal battery expansion chamber in fluid communication with said intake chamber and with said expansion fluid tank.

18. The thermal engine system of claim 17, wherein said expansion fluid pump means comprises a hermetically sealed thermal battery vacuum chamber surrounding at least part of said thermal mass, said thermal battery expansion chamber comprising at least one thermal mass expansion fluid passageway within said thermal mass for accepting expansion fluid from said expansion fluid tank to uniformly heat and expand the expansion fluid from the liquid phase to an expanded fluid in vapor phase within said thermal mass, said at least one thermal mass expansion fluid passageway accumulating pressurized expanded fluid vapor into the thermal battery expansion chamber for delivery into said intake chamber.

19. The thermal engine system of claim 9, additionally comprising a radiator in fluid communication with said variable volume cylinder expansion chamber, such that as said piston head rises to top dead center, expansion fluid vapor is passed into said radiator to cool and condense the expansion fluid vapor back into expansion liquid for delivery back into said expansion fluid source.

20. A thermal engine, comprising:
a thermal battery comprising a battery case containing a fluid chamber and a thermal mass, and a passageway through said thermal mass in fluid communication with an expansion fluid source for containing expansion fluid;
an expansion fluid source;
a thermal battery containing expansion fluid and in fluid communication with said expansion fluid source; a cylinder closed at one end by a cylinder end closure structure;
a piston having a piston head and a piston rod mechanically linked to said piston head, said piston head being slidably and sealingly retained within said cylinder to form a variable volume cylinder expansion chamber between said piston head and said cylinder end closure structure; a crankshaft mechanically linked to said piston head opposite by said piston rod;
intake valve means with an intake valve and having an exhaust valve means with an exhaust valve;
said intake valve means being fluidly connected to said intake chamber and receiving expanded expansion fluid from said thermal battery, and said exhaust valve means being fluidly connected to said cylinder expansion chamber for removal of exhausted expanded expansion fluid;
a valve operating means;
engine starting means connected to said crankshaft to rotate said crankshaft and start the engine;
an expansion fluid pump means for delivering expansion fluid from said expansion fluid source into said thermal battery;
such that when said engine starting means turns said drive shaft, said expansion fluid pump delivers a quantity of expansion fluid from an expansion fluid source into said thermal battery and said thermal battery delivers heat into the liquid expansion fluid causing the expansion fluid to expand into an expansion fluid vapor, and when said piston head is at subsequently top dead center of the cylinder chamber said valve operating means opens the intake valve means and the expansion fluid vapor is passed through said intake valve means into said cylinder expansion chamber to generate pressure and drive said piston head from substantially top dead center, to substantially bottom dead center, pressure of the expansion fluid against said piston head generating a force to turn said crankshaft and generate mechanical power using the thermodynamic potential of the expansion fluid vapor;
and such that when said piston head is at substantially bottom dead center, said valve operating means closes said intake valve means and opens said exhaust valve means and thereby permits the expansion fluid vapor to exit through said exhaust valve means for removal of exhaust expansion fluid vapor as said piston head rises to top dead center, passing expansion fluid vapor out of said cylinder.

21. The thermal engine of claim 20, wherein said thermal battery comprises a contiguous thermal battery case divided into first and second separate fluid chambers by a thermal mass for storing heat energy, said first chamber comprising a thermal battery expansion chamber in fluid communication with said intake chamber and said expansion fluid tank.

22. The thermal engine of claim 20, wherein said expansion fluid source comprises an expansion fluid tank.

23. The thermal engine of claim 20, wherein said cylinder end closure structure comprises engine block means.

24. The thermal engine of claim 23, additionally comprising an engine valve block means sealingly mounted to said engine block means and containing said intake valve and said exhaust valve.

25. The thermal engine of claim 24, additionally comprising an engine valve block means cover sealingly mated to said engine valve block means defining an intake chamber.

26. The thermal engine of claim 20, wherein said valve operating means comprises a cam shaft and cams mounted thereon, said cam shaft being drivably connected to said crankshaft.

27. The thermal engine of claim 25, wherein said thermal battery comprises a thermal mass and a contiguous thermal battery case divided into first and second separate fluid chambers by said thermal mass for storing heat energy, said first chamber comprising a thermal battery expansion chamber in fluid communication with said intake chamber and said expansion fluid tank.

28. The thermal engine of claim 27, wherein said expansion fluid pump means comprises a hermetically sealed thermal battery vacuum chamber surrounding at least part of said thermal mass, said thermal battery expansion chamber comprising at least one thermal mass expansion fluid passageway within said thermal mass for accepting expansion fluid from said expansion fluid tank to uniformly heat and expand the expansion fluid from the liquid phase to an expanded fluid in vapor phase within said thermal mass, said at least one thermal mass expansion fluid passageway accumulating pressurized expanded fluid vapor into the thermal battery expansion chamber for delivery into said intake chamber.

29. The thermal engine of claim 2, wherein said thermal battery comprises a thermal mass comprising molten salts having high thermal storage capacity, and one of a ceramic composite and metal.

30. The thermal engine of claim 2, wherein said battery comprises a thermal mass comprising a molten electrolyte salt.

31. The thermal engine of claim 9, wherein said thermal battery comprises a thermal mass comprising molten salts having high thermal storage capacity, and one of a ceramic composite.

32. The thermal engine of claim 9, wherein said battery comprises a thermal mass comprising a molten electrolyte salt.

33. The thermal engine of claim 20, wherein said thermal battery comprises a thermal mass comprising at least one molten salt having high thermal storage capacity, and a ceramic composite.

34. The thermal engine of claim 20, wherein said battery comprises a thermal mass comprising a molten electrolyte salt.

35. The thermal engine of claim 2, additionally comprising electric thermal heating means for heating said thermal mass.

36. The thermal engine (system) of claim 35, wherein said means for heating said thermal mass comprises an induction charger.

37. The thermal engine of claim 20, additionally comprising electric thermal heating means for heating said thermal mass.

38. The thermal engine (system) of claim 37, wherein said means for heating said thermal mass comprises an induction charger.

39. The thermal engine of claim 2, wherein the expansion fluid comprises water.

40. The thermal engine of claim 9, wherein the expansion fluid comprises water.

41. The thermal engine of claim 20, wherein the expansion fluid comprises water.

42. The thermal engine of claim 33, wherein said molten salt comprises at least one of: NaAlCl4 and Na.

43. A thermal engine, comprising:
a vapor source for delivering vapor at an initial vapor temperature and at an initial vapor pressure;
a cylinder closed at one end by a cylinder end closure structure;
a piston having a piston head and a piston rod mechanically linked to said piston head, said piston head being slidably and sealingly retained within said cylinder to form a variable volume cylinder chamber between said piston head and said cylinder end closure structure;
a crankshaft mechanically linked to said piston head opposite by said piston rod;
intake valve means with an intake valve and having an exhaust valve means with an exhaust valve;
said intake valve means being fluidly connected to said intake chamber and receiving vapor fluid from said vapor source, and said exhaust valve means being fluidly connected to an exhaust passageway containing a check valve permitting vapor flow away from said cylinder and not toward said cylinder, for removal of exhausted vapor, the vapor cooling in said exhaust passageway to a second vapor temperature at which said vapor condenses and thereby creates a negative pressure within said exhaust passageway and thereby creating a negative pressure in said cylinder chamber;
a valve operating means;
engine starting means connected to said crankshaft to rotate said crankshaft and start the engine;
vapor pump means for delivering vapor from said vapor source into said cylinder chamber;
such that when said engine starting means turns said drive shaft, said vapor pump means delivers a quantity of vapor through said intake valve means into said cylinder chamber until said piston head is advanced from substantially top dead center, to substantially bottom dead center, pressure of the expansion fluid against said piston head generating a force to turn said crankshaft and generate mechanical power using the thermodynamic potential of the expansion fluid vapor;
and such that when said piston head is at substantially bottom dead center, said valve operating means closes said intake valve means and opens said exhaust valve means and thereby permitting the expansion fluid vapor to exit through said exhaust valve means for removal of vapor as said piston head rises to top dead center, passing the vapor into said exhaust passageway in which the vapor cools and condenses, creating a negative pressure in the cylinder chamber to drive the piston back to top dead center, turning said drive shaft.

* * * * *